(12) United States Patent
Obayashi et al.

(10) Patent No.: US 9,436,715 B2
(45) Date of Patent: Sep. 6, 2016

(54) DATA MANAGEMENT APPARATUS AND DATA MANAGEMENT METHOD

(71) Applicant: FUJITSU LIMITED, Kawasaki-shi (JP)

(72) Inventors: Toshifumi Obayashi, Toyota (JP); Mio Okunishi, Gifu (JP); Kyohei Tamai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 13/840,544

(22) Filed: Mar. 15, 2013

(65) Prior Publication Data

US 2013/0262512 A1    Oct. 3, 2013

(30) Foreign Application Priority Data

Mar. 30, 2012 (JP) .................................. 2012-080530

(51) Int. Cl.
     *G06F 17/30*      (2006.01)

(52) U.S. Cl.
     CPC ... *G06F 17/30312* (2013.01); *G06F 17/30241* (2013.01)

(58) Field of Classification Search
     CPC ................................................ G06F 17/30241
     USPC .................................................. 707/754, 770
     See application file for complete search history.

(56) References Cited

U.S. PATENT DOCUMENTS

| 6,701,008 | B1 * | 3/2004 | Suino | ............................. 382/164 |
| 7,903,005 | B2 | 3/2011 | Ueda | |
| 2003/0112235 | A1 * | 6/2003 | Grace | ............................ 345/419 |

(Continued)

FOREIGN PATENT DOCUMENTS

| EP | 2570941 A2 | 3/2013 |
| JP | 5-197790 A | 8/1993 |

(Continued)

OTHER PUBLICATIONS

Ashraf Aboulnaga et al: "Window Query Processing in Linear Quadtrees", Distributed and Parallel Databases, Sep. 1, 2001, pp. 111-126, XP055101850, Boston DOI: 10.1023/A:1019256828670 Retrieved from the Internet: URL:https://cs.uwaterloo.ca/~ashraf/pubs/dapd01winquery.pdf, [retrieved on Feb. 13, 2014] p. 1, paragraph 4 p. 4, line 2-line 8 figures 3,4.

(Continued)

*Primary Examiner* — Mohammad S Rostami
(74) *Attorney, Agent, or Firm* — Fujitsu Patent Center

(57) ABSTRACT

A data management method including accepting a request of polygon data including data pertaining to latitude/longitude of each vertex of a polygon, specifying a minimum unit rectangle matching a minimum bounding rectangle of the polygon or including the minimum bounding rectangle from plural unit rectangles formed by recursively dividing a two-dimensional space including a latitude/longitude range and being equally divided in X and Y directions in the same number, generating a character string by assigning values to the minimum unit rectangle or all unit rectangles including the minimum unit rectangle in correspondence with the number of divided parts of the two-dimensional space in the X and Y directions, and alternately arranging the values, in the X or Y direction, starting from values corresponding to a large unit rectangle among the unit rectangles, and storing the polygon data in correspondence with a key including the character string.

9 Claims, 20 Drawing Sheets

(56) References Cited

U.S. PATENT DOCUMENTS

| | | | |
|---|---|---|---|
| 2003/0212650 | A1 | 11/2003 | Adler et al. |
| 2008/0086464 | A1 | 4/2008 | Enga |
| 2008/0162038 | A1* | 7/2008 | Comer .................. 701/208 |
| 2009/0167759 | A1* | 7/2009 | Ushida et al. ............ 345/420 |
| 2010/0069035 | A1* | 3/2010 | Johnson .............. H04W 4/02 455/404.1 |
| 2010/0250369 | A1* | 9/2010 | Peterson et al. .......... 705/14.58 |
| 2012/0179699 | A1* | 7/2012 | Ward et al. ................ 707/754 |

FOREIGN PATENT DOCUMENTS

| | | |
|---|---|---|
| JP | 2005-135440 A | 5/2005 |
| JP | 2005-338496 A | 12/2005 |
| JP | 2007-41189 | 2/2007 |
| JP | 2007-538343 A | 12/2007 |
| WO | 2005/114484 A1 | 12/2005 |

OTHER PUBLICATIONS

Anonymous: "Z-order curve—Wikipedia, the free encyclopedia", Apr. 1, 2011, XP055102450, Retrieved from the Internet: URL:http://wayback.archive.org/web/20110401153322/http://en.wikipedia.org/wiki/Z-order_curve, [retrieved on Feb. 17, 2014] section "Coordinate values"; p. 2.
Extended European Search Report of European Patent Application 13160231.0 dated Feb. 27, 2014.
Canadian Office Action dated Nov. 6, 2014 for corresponding Canadian Patent Application No. 2,809,881, 4 pages.
"Z-order curve—Wikipedia, the free encyclopedia", Apr. 1, 2011, Retrieved from the Internet on Oct. 28, 2014: URL: http://web.archive.org/web/20110401153322/http://en.wikipedia.org/wiki/Z-order_crurve, 3 pages.
Japanese Office Action mailed on Sep. 15, 2015 for corresponding Japanese Patent Application No. 2012-080530, with English Translation, 5 pages.
Taiwanese Office Action mailed on Oct. 19, 2015 for corresponding Taiwanese Patent Application No. 102109645, with Partial English Translation, 13 pages.
Chinese Office Action mailed on Dec. 1, 2015 for corresponding Chinese Patent Application No. 201310106628.5, with English Translation, 24 pages.
Canadian Office Action dated Oct. 16, 2015 for corresponding Canadian Patent Application No. 2,809,881, 3 pages.

* cited by examiner

FIG.6

| KEY (POSITION KEY) | VALUE | | | 131 |
|---|---|---|---|---|
| ++103395152637848 | id | DATA | REGISTRATION DATE/TIME | |
| | id1111 | • MOBILE ENTITY ID<br>• POLYGON DATA | ... | |
| | id2222 | ... | ... | |
| | id3333 | ... | ... | |
| ++10339515888800112233 | id | DATA | REGISTRATION DATE/TIME | |
| | id5555 | ... | ... | |
| ++103395159999900 | id | DATA | REGISTRATION DATE/TIME | |
| | id6666 | ... | ... | |
| ++103395159999901 | id | DATA | REGISTRATION DATE/TIME | |
| | id6666 | ... | ... | |
| ++103395159999910 | id | DATA | REGISTRATION DATE/TIME | |
| | id6666 | ... | ... | |

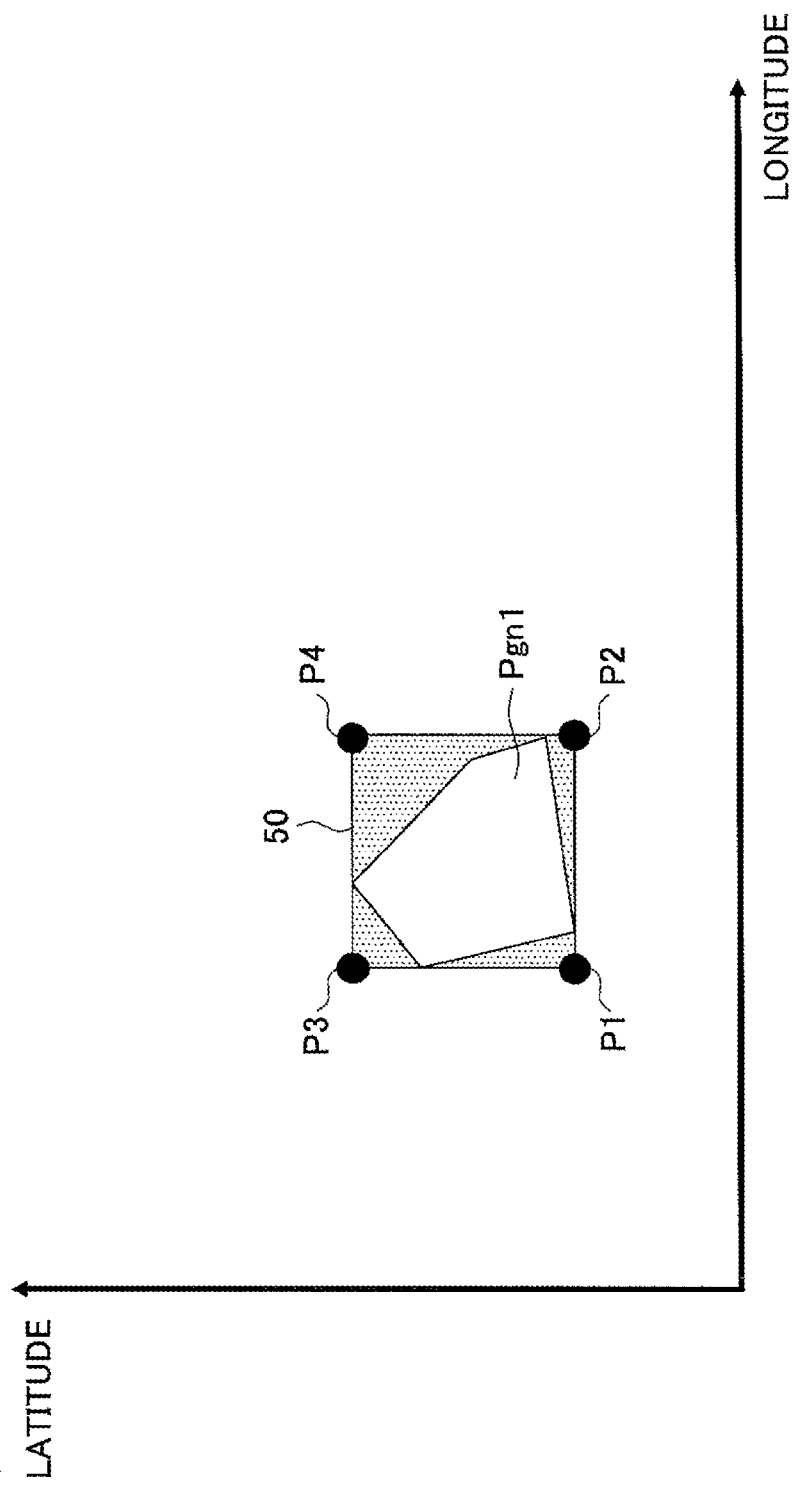

DATA MANAGEMENT APPARATUS AND DATA MANAGEMENT METHOD

CROSS-REFERENCE TO RELATED APPLICATIONS

This application is based upon and claims the benefit of priority of the prior Japanese Patent Application No. 2012-080530 filed on Mar. 30, 2012, the entire contents of which are incorporated herein by reference.

FIELD

The embodiments discussed herein are related to a data management apparatus and a data management method.

BACKGROUND

There has been studied a high speed position data searching service which gathers and manages position data including latitudes and longitudes of, for example, mobile entities and facilities. One example of the content of the search service, there is a search for a group of mobile entities included in a certain range (e.g., facility).
Patent Document 1: Japanese Laid-Open Patent Publication No. 2007-41189

The use of RDB (Relational Database) is one way of managing position data of, for example, mobile entities or facilities. For example, IDs and position data of the mobile entities or facilities may be registered to the RDB as attributes as of the mobile entities and facilities.

However, in a case of, for example, searching a group of mobile entities included in a certain range, it becomes necessary to compare the certain range and the position data of all of the records. The mobile entities, which are the targets to be managed, not only include vehicles on which vehicle devices are mounted but also include, for example, people carrying mobile terminals. Therefore, the number of records could be several tens of millions or more. Thus, it is difficult to attain a practical searching performance by comparing the position data of all of the records with the certain range.

In order to improve searching performance, there is a method of forming indices pertaining to position data. However, in this case, the indices are to be rearranged frequently because position data of the mobile entities continue to change constantly. Thus, the workload for the rearranging becomes a significantly large.

In addition, technically, the mobile entities are not positioned as points but are positioned as expansions. For example, in a case of managing position data of mobile entities such as typhoons or nimbuses, it is significant to manage their positions and their range. However, in order to search for mobile entities included in a certain range or for mobile terminals overlapping the certain range, it becomes necessary to calculate, for example, an inclusion relationship between the certain range and the ranges of the mobile entities. Thereby, search performance may be further degraded.

SUMMARY

According to an aspect of the invention, there is provided a method for managing data by causing a computer to execute a process, the process including: accepting a registration request of polygon data including data pertaining to a latitude and a longitude of each vertex of a polygon; specifying a minimum unit rectangle that matches a minimum bounding rectangle of the polygon or includes the minimum bounding rectangle from plural unit rectangles, the plural unit rectangles formed by recursively dividing a two-dimensional space including a latitude/longitude range, the two-dimensional space being equally divided in an X direction and a Y direction in the same number; generating a character string by assigning values to the identified minimum unit rectangle or all unit rectangles including the identified minimum unit rectangle in correspondence with the number of divided parts of the two-dimensional space in the X and Y directions, and alternately arranging the assigned values, in the X direction or the Y direction, starting from values corresponding to a large unit rectangle among the plural unit rectangles; and storing the polygon data in correspondence with a key including the character string in a storage unit.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

BRIEF DESCRIPTION OF DRAWINGS

FIG. 6 is a schematic diagram illustrating an example of a configuration of a mobile entity data storage unit according to an embodiment of the present invention;

FIG. 8 is a schematic diagram illustrating an example of a MBR;

DESCRIPTION OF EMBODIMENTS

Figure 1:
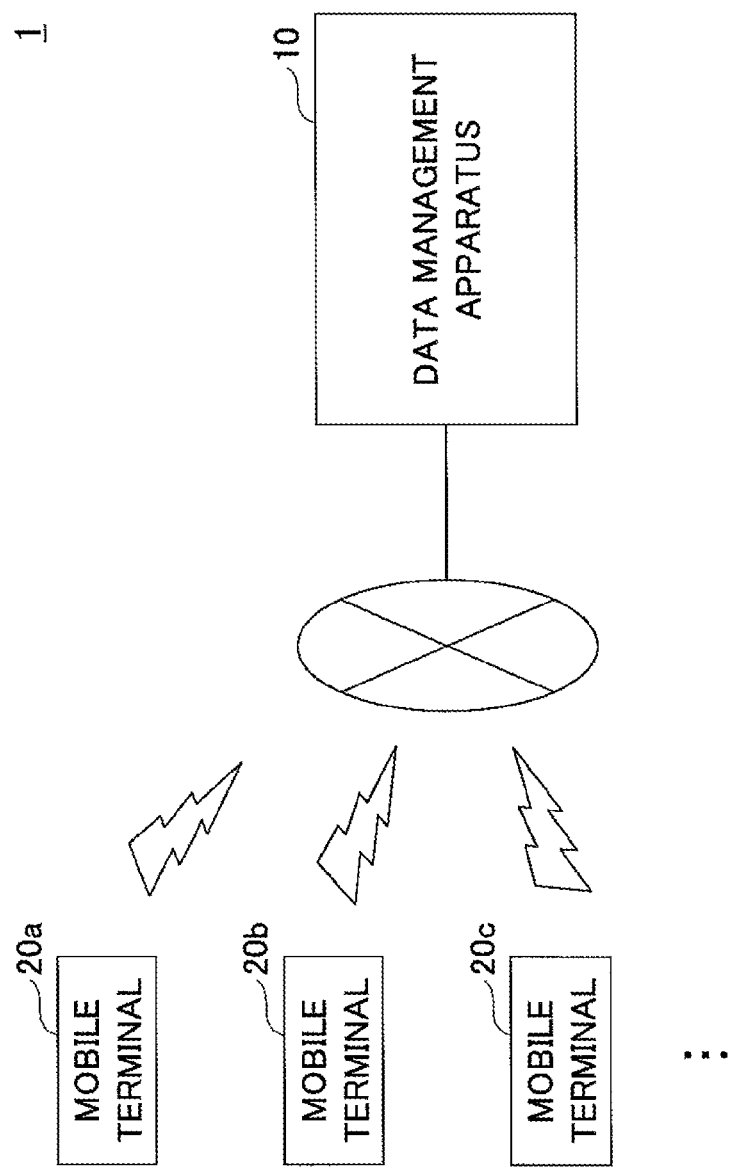
FIG. 1 is a schematic diagram illustrating an example of a configuration of a data management system according to an embodiment of the present invention.

In the following, embodiments of the present invention are described with reference to the accompanying drawings. FIG. 1 is a schematic diagram illustrating an example of a configuration of a data management system according to an embodiment of the present invention. In the data management system of FIG. 1, the multiple mobile terminals 20 including mobile terminals 20a, 20b, and 20c and the data management apparatus 10 can communicate via, for example, a mobile communications network.

The mobile terminal 20 is used for identifying the position of a mobile entity (management target). Therefore, it is preferable for the mobile terminal to have a communication function capable of using a mobile communications network and a GPS (Global Positioning System) function along with mobility. Thus, the mobile terminal 20 may, for example, an on-vehicle device, a portable telephone, a smart phone, or a tablet type terminal. The mobile entity is an entity that moves (transports) the mobile terminal 20. The mobile entity may be, for example, a vehicle on which the mobile terminal 20 is mounted or a person carrying the mobile terminal 20. However, the mobile terminal 20 itself may also be regarded as a mobile entity. Further, although, for example, typhoons, rain clouds, thunder clouds, and fronts themselves do not carry devices for measuring their positions, they may be regarded as mobile entities as long as their positions can be observed or measured from the outside.

The data management apparatus 10 according to an embodiment of the present invention is a computer that manages position data (data of latitudes and longitudes) pertaining to each mobile entity or a facility (not illustrated) or an area (not illustrated). Alternatively, multiple computers may constitute the data management apparatus 10. The data managed by the data management apparatus 10 can be searched by using each mobile terminal 20. The data to be managed may also be data that can be searched by using a stationary terminal such as a PC (personal computer). The area (not illustrated) may be a predetermined range such as an administrative district or an area whose range can be defined.

Figure 2:
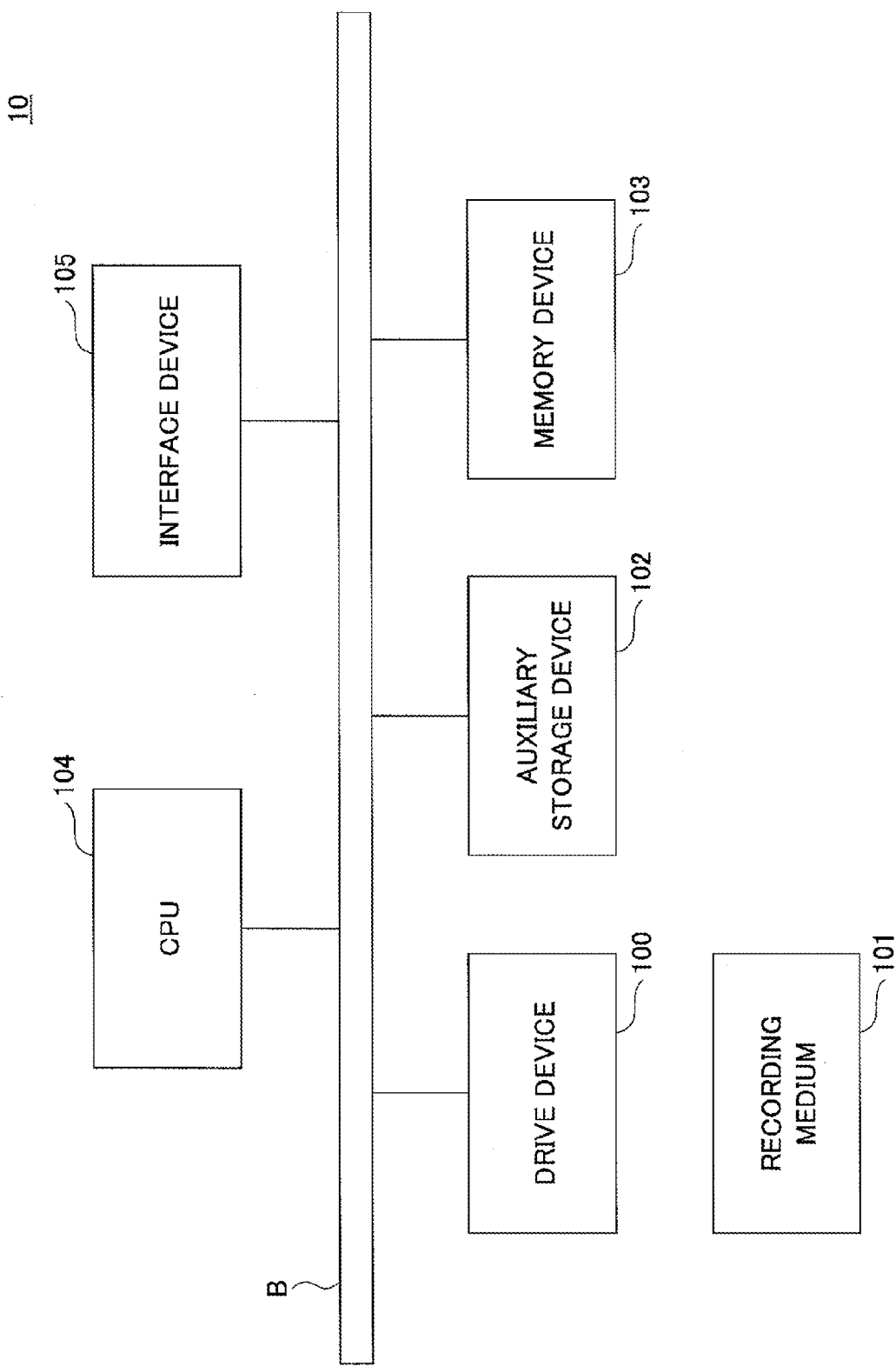
FIG. 2 is a schematic diagram illustrating an example of a hardware configuration of a data management apparatus according to an embodiment of the present invention.

FIG. 2 is a schematic diagram illustrating an example of a hardware configuration of a data management apparatus 10 according to an embodiment of the present invention. The data management apparatus of FIG. 2 includes, for example, a drive device 100, an auxiliary storage device 102, a memory device 103, a CPU (Central Processing Unit) 104, and an interface device 105 that are connected with each other by a bus B.

The program enabling processes to be executed by the data management apparatus 10 is provided from a recording medium 101. That is, the program is recorded in the recording medium 101. When the recording medium 101 is set in the drive device 100, the program is installed in the auxiliary storage device 102 from the recording medium 101 via the drive device 100. It is, however, to be noted that the installing of the program does not need to be provided from the recording medium 101. Alternatively, the program may be downloaded from another computer via a network. The auxiliary storage device 102 not only stores the program but also stores, for example, necessary files and data.

In a case where activation of the program is instructed, the memory device 103 reads the program from the auxiliary storage device 102 and stores the program therein. The CPU 104 executes a function(s) of the data management apparatus 10 according to the program stored in the memory device 103. The interface device 105 is used as an interface for connecting to a network.

The recording medium 101 may be, for example, a portable type recording medium such as a CD-ROM (Compact Disc Read-Only Memory), a DVD (Digital Versatile Disc), or a USB (Universal Serial Bus) memory. The auxiliary device 102 may be, for example, a HDD (Hard Disk Drive) or a flash memory. Both the recording medium 101 and the auxiliary storage device 102 correspond to a computer-readable recording medium.

Figure 3:
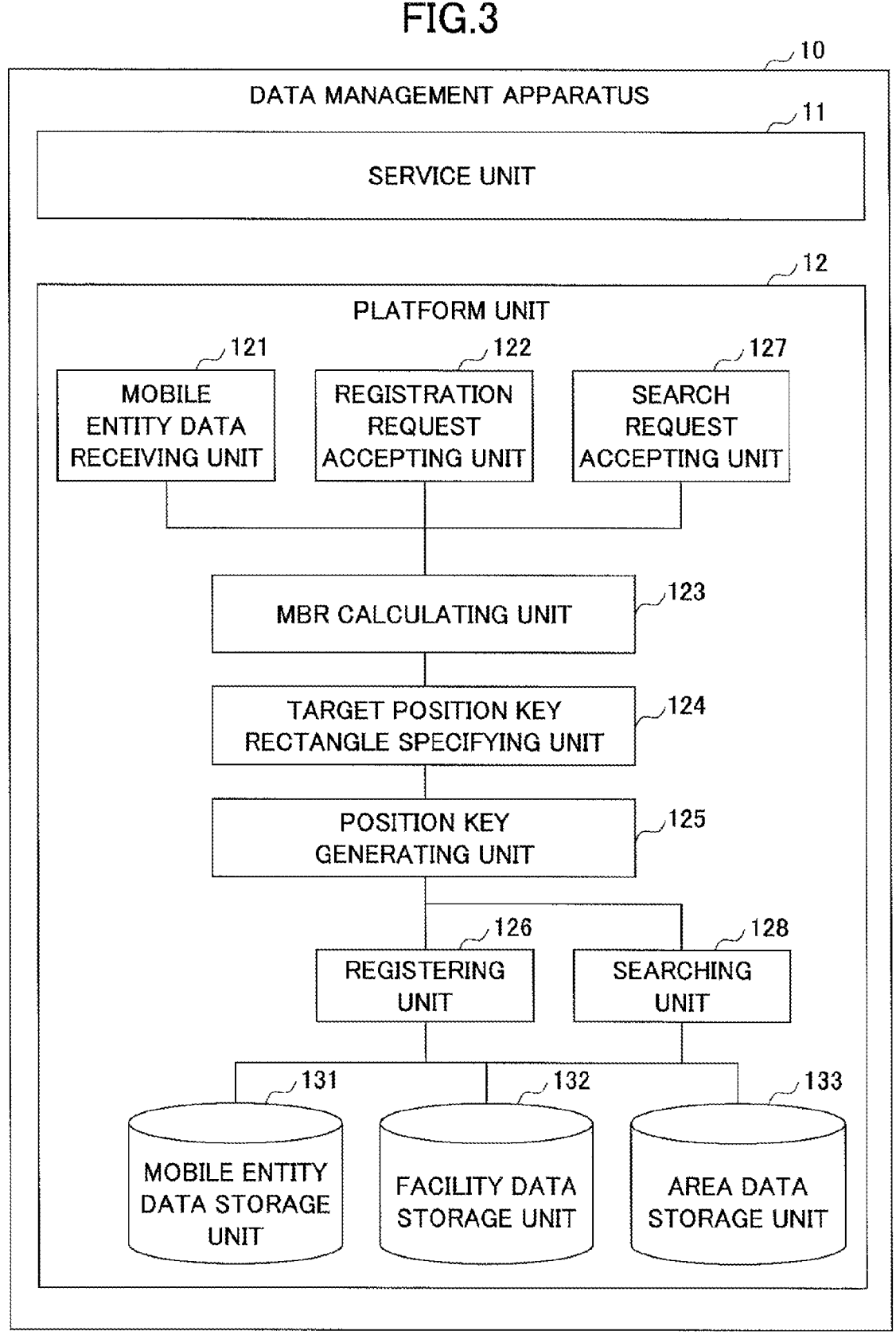
FIG. 3 is a schematic diagram illustrating an example of a functional configuration of a data management apparatus according to an embodiment of the present invention.

FIG. 3 is a schematic diagram illustrating an example of a functional configuration of the data management apparatus 10 according to an embodiment of the present invention. As illustrated in FIG. 3, the data management apparatus 10 includes a service unit 11 and a base (platform) unit 12.

The base unit 12 provides base or basic functions included in the data management function of the data management apparatus 10 to the service unit 11. Thus, the client of the base unit 12 is basically the service unit 11. The service unit 11 uses the functions provided by the base unit 12 and provides advanced (intricate) functions and services to, for example, the mobile terminal 20. Therefore, the client of the service unit 11 is basically the mobile terminal 20. The function of the base unit 12 can be used by way of an API (Application Program Interface) included in the base unit 12.

The base unit 12 includes, for example, a mobile entity data receiving unit 121, a registration request accepting unit 122, a MBR (Minimum Bounding Rectangle) calculating unit 123, a target position key rectangle specifying unit 124, a position key generating unit 125, a registering unit 126, a search request accepting unit 127, and a searching unit 128. Each of functions corresponding to these units 121-128 included in the base unit 12 is executed by CPU 104 according to the program installed in the data management apparatus 10. The base unit 12 includes and uses, for example, a mobile entity data storage unit 131, a facility data storage unit 132, and an area data storage unit 133. Each of the functions corresponding to these storage units 131-133 are executed by using, for example, a storage device connected to the auxiliary storage device 102 or the data management apparatus 10 via a storage device.

The mobile entity data receiving unit 121 successively receives, for example, position data and attribute data of the mobile entity. Data pertaining to the mobile entity such as position data of the mobile entity and attribute data of the mobile entity is hereinafter referred to as "mobile entity data". In this embodiment, position data of the mobile entity is indicated with latitudes and longitudes of each of the vertices of a polygon that expresses the shape of the mobile entity. A set (collection) of the latitudes and longitudes of each of the vertices of the polygon is hereinafter referred to as "polygon data". Accordingly, polygon data is data that indicates the position of the mobile entity along with the range of the mobile entity. Each of the latitudes and longitudes included in the polygon data may be sequentially arranged according to the order in which the polygon is formed. Further, data pertaining to the order of forming the polygon may be assigned to each of the latitudes and longitudes. That is, polygon data may include data that enables interpretation (distinguishing) of how the polygon is formed by referring to the set of latitudes and longitudes of the vertices.

The mobile entity data of each of the mobile terminals 20 is received at an appropriate timing. For example, the mobile entity data may be received at predetermined cycles or whenever the position of the mobile entity changes a predetermined amount. In one case, the mobile entity data may be directly received from each mobile terminal 20 via a mobile terminal network. In another case, the mobile entity data may be retrieved or received from another computer system that manages mobile entity data. In the latter case, the other computer system is not limited to one type of computer system. One example of the other computer system is a computer system that provides a telematics system.

It is, however, to be noted that the timing in which the mobile entity data may be different depending each mobile terminal 20. That is, mobile entity data for all of the mobile terminals 20 do not need to be received at the same time and date.

The registration request accepting unit 122 accepts registration requests from the service unit 11. The registration requests include, for example, requests for registering position data and attribute data of a facility or position data and attribute data of an area. The position data and attribute data of a facility is hereinafter referred to as "facility data". The position data and attribute data of an area is hereinafter referred to as "area data".

That is, the registration request accepting unit 122 is a part of an API provided by the base part 12. The registration request accepting unit 122 may, however, actively obtain the above-described facility data and/or the area data from another computer system. Similar to the position data of the mobile entity, the facility data and the area data are also indicated by polygon data indicating latitudes and longitudes of each of the vertices of a polygon that expresses the shape of the facility or area.

The MBR calculating unit 123 calculates a minimum bounding rectangle with respect to a polygon indicated by the polygon data included in the received mobile entity data or the facility data/area data corresponding to a registration request. The abbreviation for minimum bounding rectangle is "MBR".

One or more unit rectangles are formed in correspondence with each of the accuracies of latitude and longitude. Each of the unit rectangles is formed of a mesh, a lattice and/or an intersection of the latitudes and longitudes having a given accuracy. Accordingly, the target position key rectangle specifying unit 124 species a unit rectangle which is to be used for generating a position key (described below) from the one or more unit rectangles. The unit rectangle specified by the target position key rectangle specifying unit 124 is hereinafter referred to as "target position key rectangle". In a case where there is a minimum (smallest) unit rectangle among the one or more unit rectangles that matches the MBR of the polygon or includes the MBR, the minimum unit rectangle is the target position key rectangle. In other words, a position key that indicates the range of the minimum unit rectangle is generated. For example, in a case of forming a rectangle with latitudes and longitudes having an accuracy of $1/1000$, the rectangle is a unit rectangle having a width of $1/1000$. In a case of forming a rectangle with latitudes and longitudes having an accuracy of $1/100$, the rectangle is a unit rectangle having a width of $1/100$. For example, in a case where the MBR of a target polygon matches or is included in a unit rectangle having a width of $1/10000$ but not included in a unit rectangle having a width of $1/100000$, the unit rectangle having a width of $1/10000$ becomes the minimum unit rectangle of the target polygon. It is, however, to be noted that the target position key rectangle is not always the minimum unit rectangle (see below).

The position key generating unit 125 generates a key pertaining to the mobile entity data received by the mobile entity data receiving unit 121 or a key pertaining to the facility data or area data accepted by the registration request accepting unit 122. In this embodiment, the key is a key of a KVS (Key-Value Store). That is, in this embodiment, mobile entity data, facility data, and area data are managed by using the KVS. In this embodiment, the key is generated based on the minimum unit rectangle obtained with respect to the mobile entity, the facility, or the area. The generated key is referred to as "position key".

The registering unit 126 registers the mobile entity data, the facility data, or the area data in correspondence with the position key generated by the position key generating unit 125. The mobile entity data, the facility data, or the area data are registered in correspondence with the position key in the mobile entity data storage unit 131, the facility data storage unit 132, or the area data storage unit 133.

The mobile entity data storage unit 131 is a KVS type database that stores mobile entity data in correspondence with a corresponding position key. The facility data storage unit 132 is a KVS type database that stores facility data in correspondence with a corresponding position key. The area data storage unit 133 is a KVS type database that stores facility data in correspondence with a corresponding position key.

The search request accepting unit 127 accepts a request for searching mobile entity data, facility data, or area data (search request) from the service unit 11. The searching unit 128 searches for mobile entity data, facility data, or area data in accordance with the search request. The searching unit 128 uses, for example, the position key generated by the position key generating unit 125 to search for the requested mobile entity data, facility data, or area data.

Next, an operation (processes) executed by the data management apparatus 10 according to an embodiment of the present invention is described.

Figure 4:
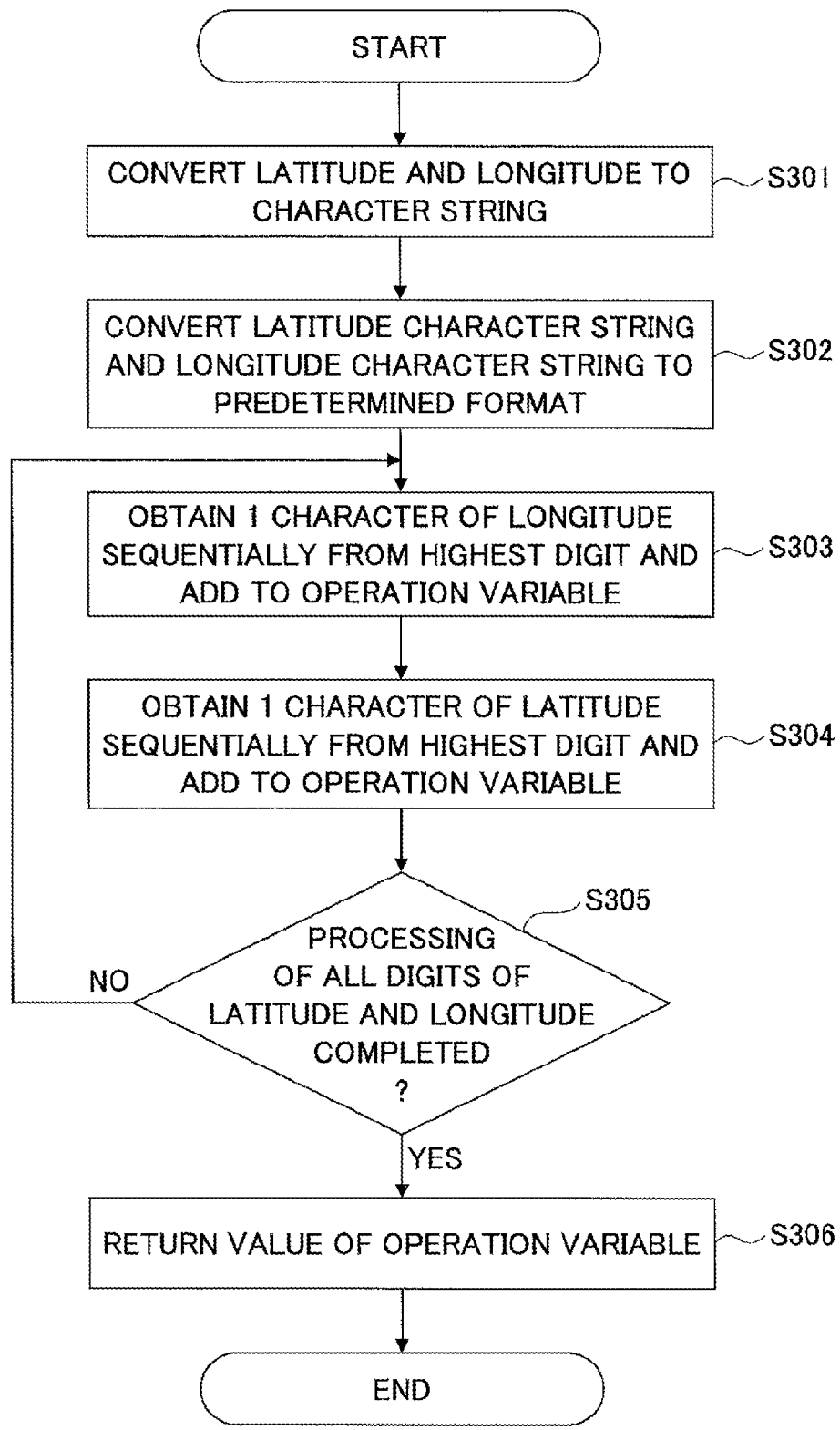
FIG. 4 is a flowchart for describing an example of procedures of generating a position key according to an embodiment of the present invention.

FIG. 4 is a flowchart for describing an example of procedures of generating a position key according to an embodiment of the present invention. These procedures are called from upper level procedures during registering or searching mobile data or the like. However, for the sake of convenience, these procedures are described before the upper level procedures.

In Step S301, a latitude and a longitude that are to be processed (hereinafter also referred to as "target latitude and target longitude") are subject to character string conversion by the position key generating unit 125. That is, the position key generating unit 125 converts the target latitude and the target longitude from numeric values to character strings. Thereby, a character string indicating latitude (hereinafter referred to as "latitude character string") and a character string indicating longitude (hereinafter referred to as "longitude character string") are generated. Assuming that, in this example, the target latitude and the target longitude are (35.5678, 139.1234), the latitude bit string is "35.5678", and the longitude bit string is "139.1234". It is to be noted that the range of latitude is "+90 degrees (north latitude) to −90 degrees (south latitude)" That is, south latitude is expressed with a negative sign (−). Further, the range of longitude is "+180 degrees (east longitude) to −180 degrees (west longitude)". That is, west longitude is expressed with a negative sign (−). It is also to be noted that, although north latitude and east latitude is expressed with a positive sign (+), the value of the north latitude and the east latitude may be expressed without the positive sign. The range to be expressed with a positive sign (+) and the range to be expressed with a negative sign (−) is not limited to those described above.

Then, the position key generating unit 125 converts the latitude character string and the longitude character string are converted to a predetermined format (S302). First, in a case where the integer portion of the character string is 1 digit or 2 digits, a character "0 (zero)" is inserted to the beginning of integer portion, so that the integer portion of the character string consists of 3 digits. Therefore, the latitude character string becomes "035.567". Because the integer portion of the longitude bit string is initially consists of 3 digits, the integer portion of the longitudinal character string remains as "139.1234". Further, based on the initial values of the target latitude and the target longitude, a positive sign (+) or a negative sign (−) is added to the beginning of the latitude bit string and the longitude bit string. Therefore, in this example, the latitude character string becomes "+035.5678" and the longitude character string becomes "+139.1234". Further, the character indicating the decimal point "." is omitted from the character strings. Accordingly, the latitude character string becomes "+0355678" and the longitude character string becomes "+1391234". Further, a character "0 (zero)" is added to the portion after the decimal point (below-decimal portion) with respect to the character string having a shorter below-decimal portion. For example, in a case where the longitude character string prior to conversion is "35.567" and the latitude character string prior to conversion is "139.1234", the character "0" is added to the longitude character string "35.567" having a shorter below-decimal portion than that of the latitude character string. As a result, the longitude character string becomes "+0355670".

Thereby, the process of converting the latitude character string and the longitude character string the predetermined format is completed.

Then, the position key generating unit 125 sequentially obtains one character starting from the most significant (highest digit) character of the longitude character string and adds the obtained character to the beginning (top) of a character string variable to be used for performing an operation described below (hereinafter also referred to as "operation variable"). Accordingly, in a case of performing Step S303 for the first time, the character "+" is obtained from the longitude character string "+0355678" and added to the operation variable. The operation variable used in Step S304 is the same as the operation variable used in Step S303. Therefore, at the stage where Steps S303 and S304 are completed, the content of the operation variable is "++". The order in which Steps S303 and Step S304 are performed is not limited to that described above.

Steps S303 and S304 are repeated until the processes of Steps S303 and S304 have been performed on all of the digits of the latitude character string and the longitude character string (Step S305). As a result, by alternately adding a character belonging to the same digit from the top of the latitude and longitude character strings, a single character string constituted by the alternately added characters of the latitude and longitude character strings is obtained and stored in the operation variable. The obtained character string corresponds to a character string serving as the position key. Accordingly, the position key generating unit 125 returns the value stored in the operation variable (i.e. position key) in Step S306.

In this embodiment, the position key is also used as data indicating a range of a rectangle (rectangle range) in which one side of the rectangle is a unit corresponding to the accuracy of the latitude and longitude of the position key. For example, in a case where the latitude and longitude is (35.5678, 139.1234), the rectangle range in which one side of the rectangle is a unit corresponding to the accuracy of the latitude and the longitude is a rectangle range in which one side is 1/10000. Therefore, the position key is technically a key including data indicating a range. The significance of generating the position key is described below.

Figure 5:
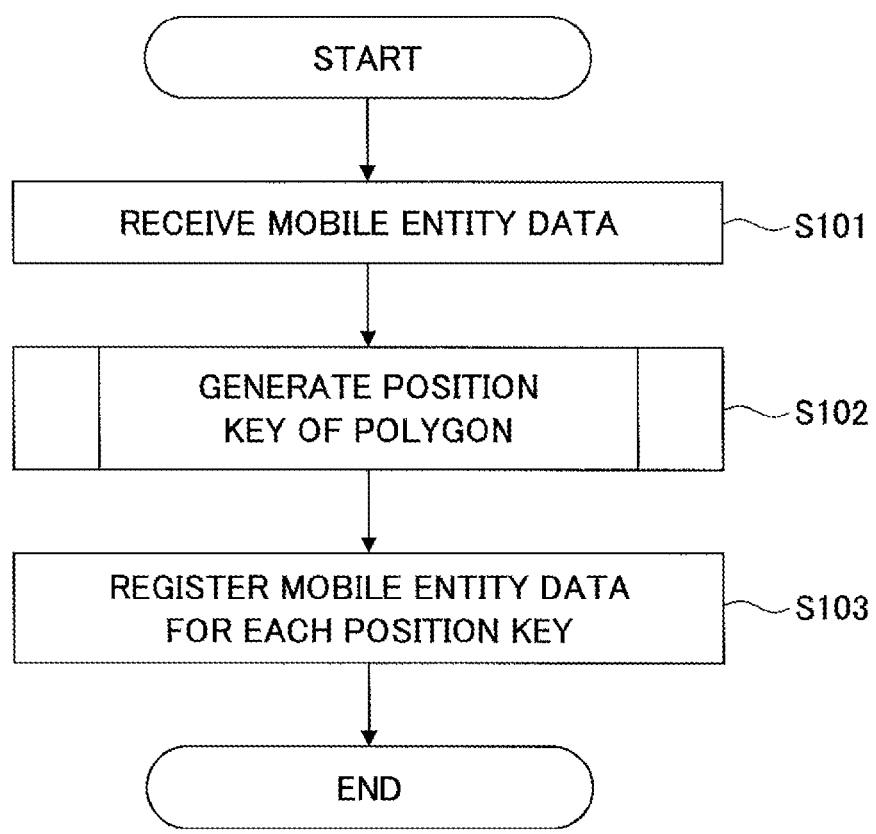
FIG. 5 is a flowchart for describing an example of procedures of registering mobile entity data according to an embodiment of the present invention.

Next, an operation (processes) of registering mobile entity data is described. FIG. 5 is a flowchart for describing an example of procedures of registering mobile entity data according to an embodiment of the present invention.

In Step S101, the mobile entity data receiving unit 121 according to an embodiment of the present invention receives mobile entity data along with a request for registering mobile entity data. The mobile entity data includes, for example, identification data of a mobile entity and polygon data of a mobile entity. The identification data of the mobile entity is hereinafter referred to as "mobile entity ID". Multiple polygon data may be included in the mobile entity data pertaining to a single mobile entity. That is, the shape of a single mobile entity may be expressed with multiple polygons. Other attribute data pertaining to a mobile entity may also be included in the mobile entity data.

Then, a process of generating a position key corresponding to a polygon expressing the shape of a mobile entity is performed by, for example, the MBR calculating unit 123, the target position key rectangle specifying unit 124, and the position key generating unit 125 (Step S102). In a case where a mobile entity is expressed with multiple polygons, Step S102 is performed on each of the multiple polygons. As described below, multiple keys may be generated with respect to a single polygon.

Then, the registering unit 126 associates the values of data included in the mobile entity data (e.g., mobile entity ID, polygon data) with each of the generated position keys and registers the values of data included in the mobile entity to the mobile entity data storage unit 131 in correspondence with the associated position keys (Step S103).

FIG. 6 is a schematic diagram illustrating an example of a configuration of the mobile entity data storage unit 131 according to an embodiment of the present invention. As illustrated in FIG. 6, the mobile entity data storage unit 131 stores a "value" in correspondence with a "key". In this embodiment, a position key generated with respect to a polygon expressing the shape of a mobile entity is stored in the "key" of the mobile entity data storage unit 131. The "value" may include one or more rows. Each row of "value"

corresponds to a single mobile entity. Each row of includes 3 items (columns) which are "id", "data", and "registration date/time". Mobile entity IDs are stored in the item "id". Polygon data and other attribute data are stored in the item "data". The item "registration date/time" indicates the time and date in which a row of data has been registered. It is to be noted that multiple rows (multiple mobile entities) may be associated with one position key. This is because multiple mobile entities may be located at the same latitude and longitude at the same time or at a different time. This is also because the same position key may be generated with respect to mobile entities are located at different positions (as described below) due to the position key being generated with respect to each unit rectangle including a MBR of a polygon of a mobile entity.

In a case where multiple position keys are generated in Step S102, the mobile entity data storage unit 131 has values associated with each of the multiple position keys and stored in correspondence with the position keys. In this case, the values associated with the multiple position keys with respect to the same position data may be the same. For example, in FIG. 6, 3 position keys are assigned to the mobile entity having a mobile ID of "id6666".

It is to be noted that the configuration illustrated in FIG. 6 is merely an example, and the configuration of the values may be arbitrarily changed.

The processes illustrated in FIG. 5 are executed whenever mobile entity data is received. Accordingly, mobile entity data pertaining to each of the multiple mobile entities is constantly received and registered in the mobile entity data storage unit 131 in the manner illustrated in FIG. 6.

The mobile entity data storage unit 131 is set to function as a KVS engine in which the data registered in the mobile entity data storage unit 131 is deleted when a predetermined time elapses after the data has been registered in the mobile entity data storage unit 131. Accordingly, in a case where a predetermined time elapses after data has been registered in the mobile entity data storage unit 131, the data is deleted from the mobile entity data storage unit 131. This signifies that position data of each mobile entity is managed in the mobile entity data storage unit 131.

Although the processes of registering mobile entity data are described with FIG. 5, the registration request accepting unit 122 basically executes the same processes illustrated in FIG. 5 in a case where a request for registering, for example, facility data or area data is received. However, in the case of facility data, the mobile entity ID is replaced with a facility ID (i.e. identification data of a facility), and the destination (place) in which the facility ID is registered is the facility data storage unit 132. Likewise, in the case of area data, the mobile entity ID is replaced with an area ID (i.e. identification data of an area), and destination (place) in which the area ID is registered is the area data storage unit 133. Further, the facility data storage unit 132 and the area data storage unit 133 are set to refrain from automatically deleting data registered therein in a case where a predetermined time elapses after the data has been registered in the facility data storage unit 132 or the area data storage unit 133. This is because position data of a facility or an area basically does not constantly change (unlike a mobile entity).

Figure 7A:
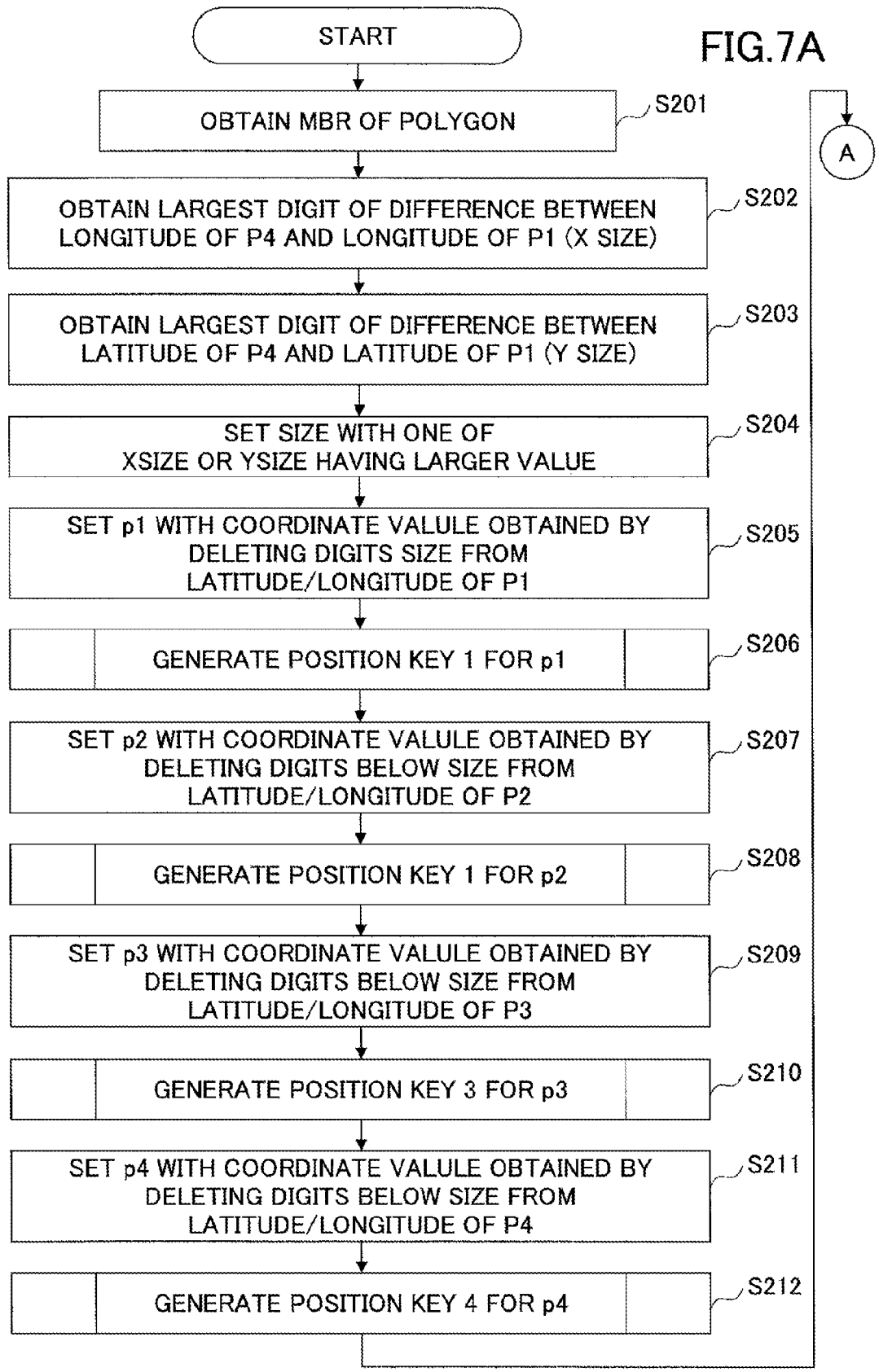
FIGS. 7A-7B are schematic diagrams for describing an example of procedures of generating a position key(s) with respect to a polygon according to an embodiment of the present invention.
Figure 7B:
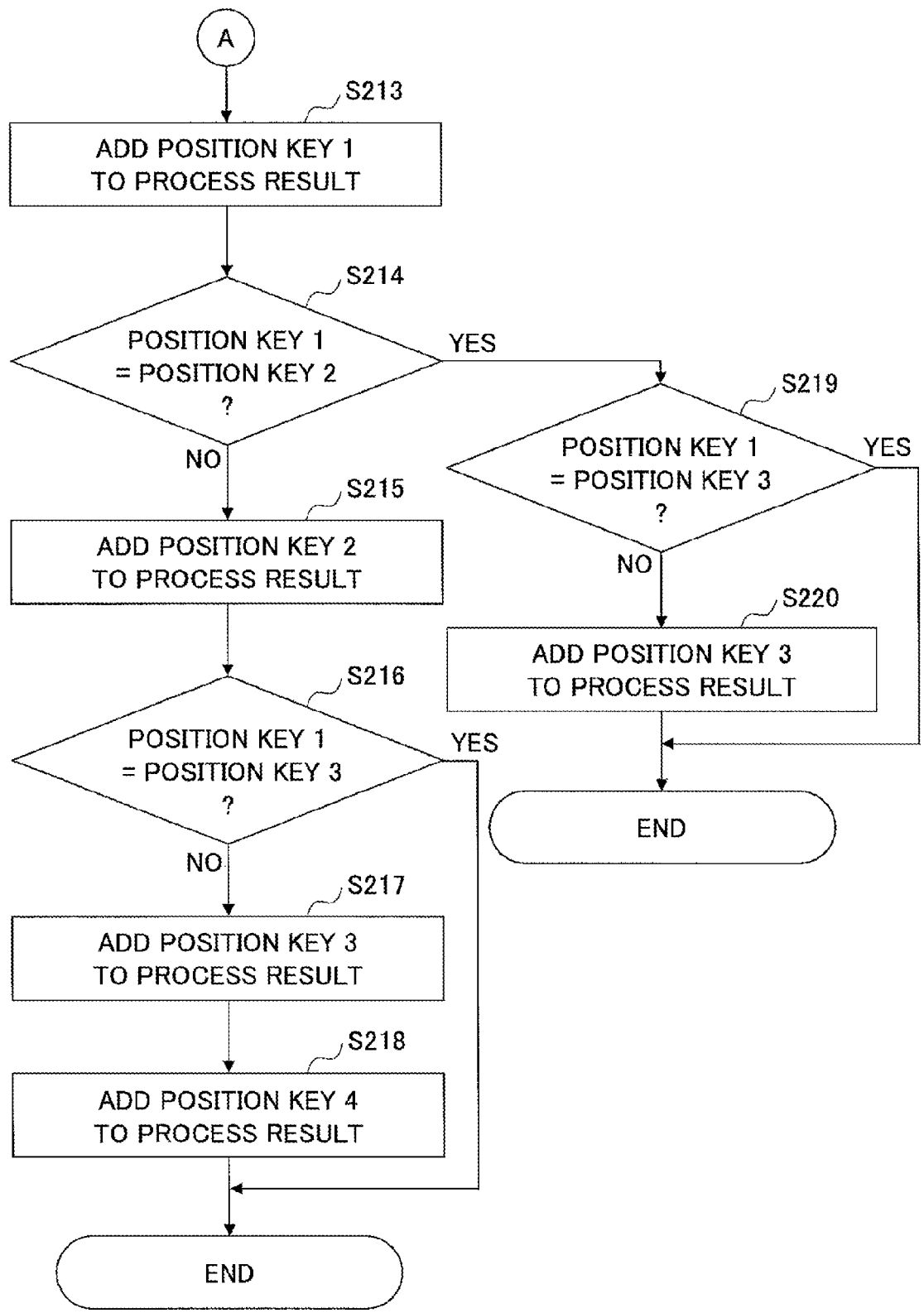

Next, Step S102 of FIG. 5 is described in further detail. FIGS. 7A-7B are schematic diagram for describing an example of procedures of generating a position key(s) with respect to a polygon according to an embodiment of the present invention.

In Step S201, the MBR calculating unit 123 obtains an MBR with respect to a target polygon. In this embodiment, the target polygon is a polygon indicating polygon data in the mobile entity data in a case where the process of FIG. 5 is called in Step S102.

FIG. 8 is a schematic diagram illustrating an example of a MBR. FIG. 8 illustrates a MBR 50 with respect to a polygon Pgn1 according to an embodiment of the present invention.

It is to be noted that, in Step S102, the coordinates of each vertex of the MBR is calculated. In the example of FIG. 8, the latitude and the longitude of each of the vertices P1-P4 are calculated. Among the longitudes of each of the vertices of the polygon Pgn1, the minimum longitudes are the longitude of vertex P1 and the longitude of vertex P3. Among the longitudes of each of the vertices of the polygon Pgn1, the maximum longitudes are the longitude of vertex P2 and the longitude of vertex P4. Among the latitudes of each of the vertices of the polygon Pgn1, the maximum latitudes are the latitude of vertex P3 and the latitude of vertex P4. Among the latitudes of each of the vertices of the polygon Pgn1, the minimum latitudes are the latitude of vertex P1 and the latitude of vertex P2.

Then, a process for specifying a target position key rectangle is performed by the target position key rectangle specifying unit 124. Next, a process of obtaining a target position rectangle is described by using a specific example.

Figure 9:
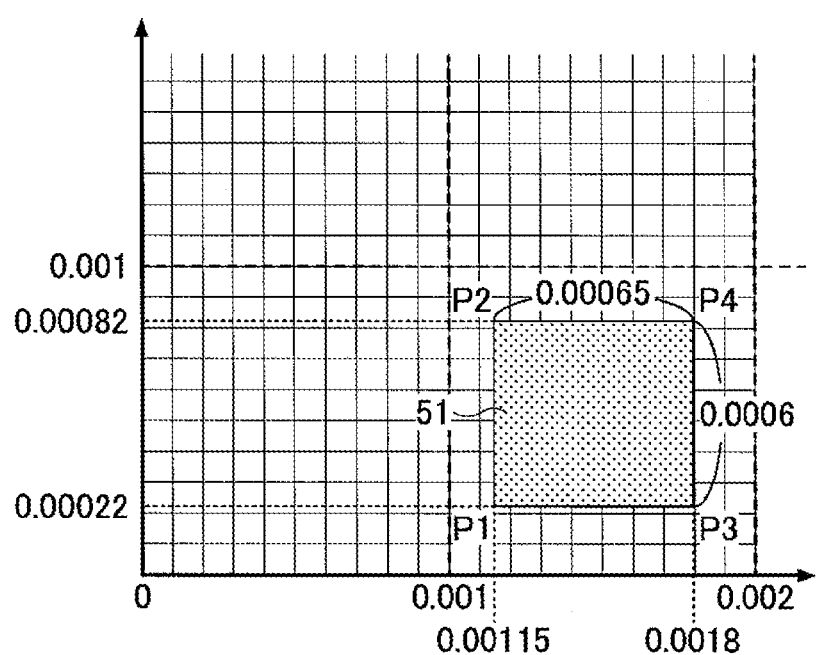
FIG. 9 is a schematic diagram illustrating a first example of a MBR for describing a process of obtaining (calculating) a minimum unit rectangle.

FIG. 9 is a schematic diagram illustrating a first example of a MBR for describing a process of obtaining (calculating) a minimum unit rectangle. That is, FIG. 9 is for describing a process of obtaining a minimum unit rectangle that independently constitutes a target position key rectangle. The coordinates of each of the vertices of the MBR 51 are illustrated in FIG. 9.

In Step S202, the target position key rectangle specifying unit 124 obtains a largest digit of the difference between the longitude of vertex P4 and the longitude of vertex P1. The largest digit is the largest digit among the digits to which a significant digit(s) belongs. In the example of FIG. 9, the difference between the longitude of the vertex P4 and the longitude of the vertex P1 (i.e. width of MBR 51) is 0.00065. In the example of FIG. 9, the largest digit among the significant digits of the value "0.00065" is "6" belonging to the maximum digit of $1/10000$. Accordingly, in this example, the largest digit is $1/10000$.

Then, the target position key rectangle specifying unit 124 obtains a largest digit of the difference between the latitude of vertex P4 and the latitude of vertex P1 (Step S203). In FIG. 9, the difference between the latitude of the vertex P4 and the latitude of the vertex P1 (i.e. height of MBR 51) is 0.0006. In the example of FIG. 9, the largest digit among the significant digits of the value "0.0006" is only "6" belonging to the largest digit of $1/10000$. Therefore, in this example, the largest digit is $1/10000$.

Then, the target position key rectangle specifying unit 124 obtains the larger digit between the two largest digits obtained by the target position key rectangle specifying unit 124 (Step S204). The larger digit is hereinafter referred to as "rounded digit". In a case where both of the obtained largest digits are the same, both of the obtained largest digits are referred to as "rounded digit", respectively. If both of the obtained digits are equal to or below the decimal point, the digit that is closer to the decimal point corresponds to the "rounded digit". If both of the obtained digits are equal to or above the decimal point, the digit that is farther from the decimal point corresponds to the "rounded digit". Accordingly, in a case where the two largest digits are "$1/100000$" and "1/10000", the digit of "1/10000" becomes the larger digit. In the example of FIG. 9, the rounded digit is "1/10000" because both rounded digits are "1/10000".

Then, the target position key rectangle specifying unit 124 obtains a rounded coordinate values p1 of the latitude and longitude of vertex P1 of the MBR 51 (Step S205). The rounded coordinate value p1 is a value in which a significant numeral below a rounded digit is deleted from the latitude and the longitude of vertex P1. That is, deleting the significant numeral(s) below the rounded digit is to replace the significant numeral(s) below the rounded digit with "0". In this example, the longitude and latitude of the vertex P1 is (0.00115, 0.00022). Accordingly, the rounded coordinate value p1 is (0.001, 0). Then, the position key generating unit 125 generates a position key of the rounded coordinate value p1 (Step S206). That is, the above-described processes illustrated in FIG. 4 are performed on the rounded coordinate value (0.001, 0). Thereby, the position key of (0.001, 0) is generated. The position key generated based on the rounded coordinate value p1 is hereinafter referred to as "position key 1".

Then, the target position key rectangle specifying unit 124 obtains a rounded coordinate value p2 (in which numerals below the rounded digit is deleted) of the latitude and longitude of the vertex P2 of the MBR 51 (Step S207). In this example, the longitude and latitude of the vertex P2 is (0.00115, 0.00082). Accordingly, the rounded coordinate value p2 is (0.001, 0). Then, the position key generating unit 125 generates a position key of the rounded coordinate value p2 (Step S208). The position key generated based on the rounded coordinate value p2 is hereinafter referred to as "position key 2".

Then, the target position key rectangle specifying unit 124 obtains a rounded coordinate value p3 (in which numerals below the rounded digit is deleted) of the latitude and longitude of the vertex P3 of the MBR 51 (Step S209). In this example, the longitude and latitude of the vertex P3 is (0.0018, 0.00022). Accordingly, the rounded coordinate value p3 is (0.001, 0). Then, the position key generating unit 125 generates a position key of the rounded coordinate value p3 (Step S210). The position key generated based on the rounded coordinate value p3 is hereinafter referred to as "position key 3".

Then, the target position key rectangle specifying unit 124 obtains a rounded coordinate value p4 (in which numerals below the rounded digit is deleted) of the latitude and longitude of the vertex P4 of the MBR 51 (Step S213). In this example, the longitude and latitude of the vertex P4 is (0.0018, 0.00082). Accordingly, the rounded coordinate value p4 is (0.001, 0). Then, the position key generating unit 125 generates a position key of the rounded coordinate value p4 (Step S212). The position key generated based on the rounded coordinate value p4 is hereinafter referred to as "position key 4".

Then, the target position key rectangle specifying unit 124 adds the position key 1 to a process result (Step S213). The process result is the result of performing the processes illustrated in FIG. 7. Thus, adding the position key 1 to the process result signifies that the position key 1 is set as a position key of a target polygon. That is, in FIG. 9, the MBR 51 includes a target unit rectangle in which one side of the unit rectangle is 1/1000. Further, in FIG. 9, the left lower vertex of the MBR 51 is (0.001, 0). In a case of supposing that the unit rectangle is divided into 10 parts in the latitude direction and the longitude direction (i.e. dividing the unit rectangle into 100 unit rectangle parts), each of the unit rectangle parts do not include the MBR 51. Accordingly, the unit rectangle, which has its left lower vertex indicated as (0.001, 0) and has each side being 1/1000, corresponds to the minimum unit rectangle. The position and range of the minimum unit rectangle is indicated with the position key 1. Accordingly, the position key 1 is determined as the position key of the target polygon.

It is to be noted that, the position key 1 being associated with the target polygon signifies that the range of the target polygon is rounded to the unit rectangle indicated by the position key 1. As described below, a high speed search process can be performed by rounded the range of the target polygon with a unit rectangle indicated by the position key 1.

Then, the target position key rectangle specifying unit 124 determines whether the position key 1 and the position key 2 are the same (Step S214). With respect to the MBR 51, the rounded coordinate value p1 and the rounded coordinate value p2 are the same. That is, the position key 1 and the position key 2 match. Therefore, the process illustrated in FIG. 7 proceeds to Step S219.

In Step S219, the target position key rectangle specifying unit 124 determines whether the position key 1 and the position key 3 are the same. With respect to the MBR 51, the rounded coordinate value p1 and the rounded coordinate value p3 are the same. That is, the position key 1 and the position key 3 should match. Therefore, the process illustrated in FIG. 7 is terminated.

On the other hand, in a case where the position key 1 and the position key 3 are different (No in Step S219), the target position key rectangle specifying unit 124 adds the position key 3 to the process result (Step S220). That is, the position key 3 is also assumed as a position key of the target polygon.

Further, in Step S214, in a case where the position key 1 and the position key 2 are different (No in Step S214), the target position key rectangle specifying unit 124 adds the position key 2 to the process result (Step S215). That is, the position key 2 is also assumed as a position key of the target polygon. Then, the target position key rectangle specifying unit 124 determines whether the position key 1 and the position key 3 are the same (Step S216). In a case where the position key 1 and the position key 3 are different (No in Step S216), the target position key rectangle specifying unit 124 adds the position key 3 to the process result (Step S217). That is, the position key 3 is also assumed as a position key of the target polygon. Then, the target position key rectangle specifying unit 124 adds the position key 4 to the process result (Step S218). That is, the position key 3 is also assumed as a position key of the target polygon.

The process result at the time of terminating the process illustrated in FIG. 7 may be used in, for example, Step S103 of FIG. 5. That is, the mobile entity data is registered in correspondence with each of the position keys existing in the process result at the time of terminating the process illustrated in FIG. 7.

Figure 10A:
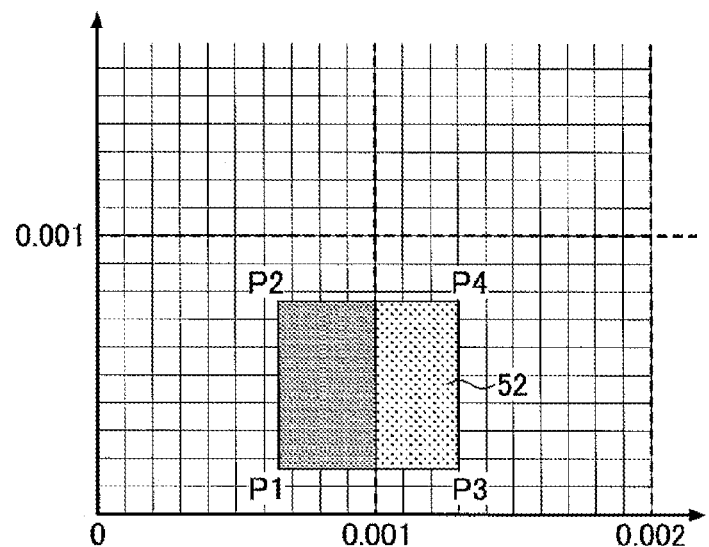
FIGS. 10A-10C are schematic diagrams illustrating examples where multiple position keys are generated with respect to a single polygon.
Figure 10B:
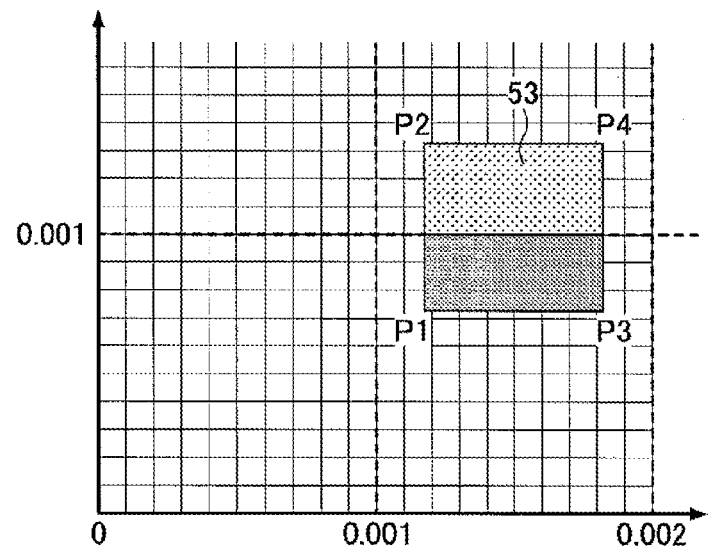
Figure 10C:
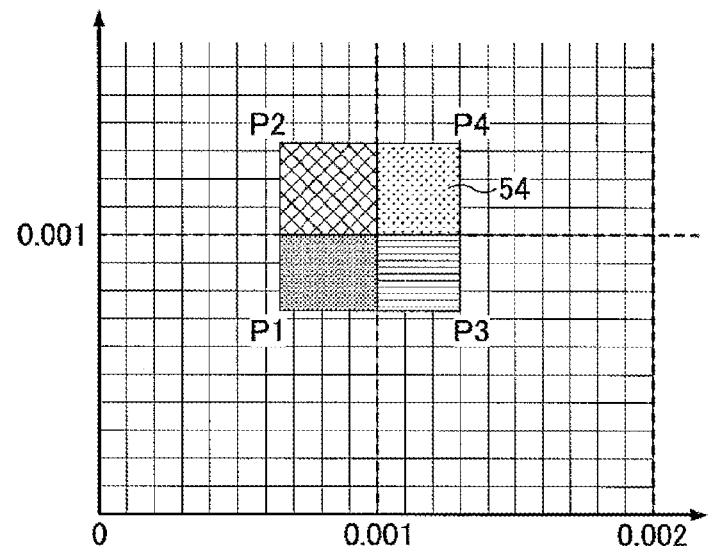

Next, the significance of processes performed on and after Step S214 is described. The processes performed on and after Step S214 indicate that 2 or more position keys may be generated with respect to a single polygon. In the example of FIG. 9, the entire MBR 51 is included in a rectangular range of the position key 1. On the other hand, in a case where an MBR has a position and range as illustrated in FIGS. 10A-10C, the entire MBR is not included in the rectangular range of the positional key 1 generated with respect to the MBR. That is, the entire MBR is not included in a minimum unit rectangle that may include the MBR. The "minimum unit rectangle that may include the MBR" signifies a unit rectangle that is minimum in size among the unit rectangles including the MBR and has a size into which the MBR cannot be included therein.

FIGS. 10A-10C are schematic diagrams illustrating examples where multiple position keys are generated with respect to a single polygon.

As illustrated in FIGS. 10A-10C, MBRs 52, 53, and 54 are, in terms of size, included in a unit rectangle of $1/1000$, respectively. However, the MBRs 52, 53, and 54 step over a boundary of the unit rectangle of $1/1000$, respectively. That is, each of the MBRs 52, 53, and 54 has a part included in multiple unit rectangles of $1/1000$. In this case, each MBR 52, 53, 54 is not included in a unit rectangle of the position key 1 generated with respect to the MBRs 52, 53, 54. More specifically, in a case illustrated in FIG. 10A, the range indicated by the position key 1 of the MBR 52 is a unit rectangle in which one side of the unit rectangle is $1/1000$, and the left lower vertex of the MBR 52 is (0, 0). However, a part of the MBR 52 that exceeds the longitude of 0.001 is not included in the unit rectangle.

Further, in a case illustrated in FIG. 10B, the range indicated by the position key 1 of the MBR 53 is a unit rectangle in which one side of the unit rectangle is $1/1000$, and the left lower vertex of the MBR 52 is (0.001, 0). However, a part of the MBR 53 that exceeds the latitude of 0.001 is not included in the unit rectangle.

Further, in a case illustrated in FIG. 10C, the range indicated by the position key 1 of the MBR 54 is a unit rectangle in which one side of the unit rectangle is $1/1000$, and the left lower vertex of the MBR 54 is (0, 0). However, a part of the MBR 54 that exceeds the longitude and the longitude of 0.001 is not included in the unit rectangle.

Therefore, in the processes performed on and after Step S214, when a target MBR has a portion that is not included in a unit rectangle indicated by the position key 1, a position key corresponding to a unit rectangle including said portion is added to the process result. That is, in addition to the unit rectangles indicated by the position key 1, the unit rectangle that is not included in the unit rectangles indicated by the position key 1 is also assumed as a target position key rectangle. As a result, the range of the MBR is rounded by combinations of multiple unit rectangles.

In the example of FIG. 10A, the position key 3 is added to the process result in Step S220. In the example of FIG. 10A, the range indicated by the position key 3 includes a unit rectangle in which one side of the unit rectangle is $1/1000$, and the left lower vertex of the unit rectangle is (0.001, 0).

In the example of FIG. 10B, the position key 2 is added to the process result in Step S215. In the example of FIG. 10B, the range indicated by the position key 2 includes a unit rectangle in which one side of the unit rectangle is $1/1000$, and the left lower vertex of the unit rectangle is (0.001, 0.001).

In the example of FIG. 10C, the position key 2 is added to the process result in Step S215, and the position keys 3 and 4 are added to the process result in Steps S217 and S218. In the example of FIG. 10C, the range indicated by the position key 2 includes a unit rectangle in which one side of the unit rectangle is $1/1000$, and the left lower vertex of the unit rectangle is (0, 0.001). Further, in the example of FIG. 10C, the range indicated by the position key 3 includes a unit rectangle in which one side of the unit rectangle is $1/1000$, and the left lower vertex of the unit rectangle is (0.001, 0). Further, in the example of FIG. 10C, the range indicated by the position key 4 includes a unit rectangle in which one side of the unit rectangle is $1/1000$, and the left lower vertex of the unit rectangle is (0.001, 0.001).

Accordingly, multiple position keys may be generated with respect to a single MBR (a single polygon).

In this embodiment, multiple position keys are generated because a unit rectangle having a size larger than an initial polygon may be assumed as a target position key rectangle in a case where the minimum unit rectangle is constantly assumed as the target position key rectangle.

In other words, in this embodiment, the definition of a "minimum unit rectangle" is a unit rectangle that is smallest (minimum) among the multiple unit rectangles (being formed of a mesh, a lattice and/or an intersection of latitudes and longitudes having widths corresponding to different accuracies) and matches a polygon-shaped MBR or includes the polygon-shaped MBR. In a case of applying this definition to the examples of FIGS. 10A-10C, the minimum unit rectangle that matches each MBR 52, 53, 54 or includes each MBR 52, 53, 54 is a unit rectangle in which one side of the unit rectangle is $1/100$, and the left lower vertex of the unit rectangle is (0, 0). More specifically, one side of the unit rectangle is $1/100$. The unit rectangle having a side of $1/100$ is equivalent to 1000 unit rectangles in which one side of each of the 1000 unit rectangles is $1/1000$. Therefore, the unit rectangle, which a side of $1/100$, has an area that is 100 times or more of each MBR 52, 53, 54. As the range of a MBR or the range of a polygon, such unit rectangle significantly deviates from an initial polygon.

Therefore, in this embodiment, a position key with respect to the minimum unit rectangle is not always assumed as the position key of the initial polygon. Instead, the position key of the initial polygon may be a position key with respect to multiple unit rectangles having minimum size, including an MBR or stepping over the MBR. Thereby, the above-described problem of using a single minimum unit rectangle can be prevented.

Next, a process of searching mobile entity data (search process) is described.

In Step S501, the search request accepting unit 127 accepts a request for searching mobile entity data (search request) from the service unit 11. The service unit 11 inputs a search request to the search request accepting unit 127 in accordance with a search request from the mobile terminal 20 or a stationary terminal (not illustrated).

The search request includes, for example, data designating the range in which the mobile entity data is to be searched (search range) and a type of search to be performed (search type). The search range is designated with the same format as the polygon data of the mobile entity. That is, the search range is designated by a set of latitudes and longitudes of each vertex of the polygon indicating the search range.

The search type includes data indicating the relationship in which a target mobile entity data (mobile entity data to be searched) has with respect to the search range. In this embodiment, there are 3 ways to designate the search type. The first way to designate the search type is to designate mobile entity data included in the search range. The second way to designate the search type is to designate mobile entity data that includes the search range. The third way to designate the search type is to designate mobile entity data that overlaps with the search range.

Then, a process of generating a position key with respect to a polygon of the designated search range is performed by, for example, the MBR calculating unit 123, the target position key rectangle specifying unit 124, and the position key generating unit 125 (Step S502). The process of generating the position key is performed as described with FIG. 7. Accordingly, more than one position key is generated.

The generated position key(s) is a key that is used for the search. In order to avoid confusion between the generated position key and a position key registered in the mobile entity data storage unit 131 in correspondence with a search object (e.g., target mobile entity data), the generated position key is hereinafter referred to as "search key".

Then, the searching unit 128 determines the type of search designated in the search request. In a case where the search is for a mobile entity included in a search range (Yes in Step S503), the searching unit 128 executes a search for a mobile entity included in a search range (Step S504). On the other hand, in a case where the search is for a mobile entity including a search range (Yes in Step S505), the searching unit 128 executes a search for a mobile entity including the search range (Step S506). Further, in a case where the search is for a mobile entity overlapping a search range (Yes in Step S507), the searching unit 128 executes a search for a mobile entity that overlaps a search range (Step S508).

Following step S504, step S505, or step S508, the searching unit 128 responds to the search request input from the service unit 11 by returning a search result to the service unit 11 (Step S509). The search result includes data of the mobile entity resulting from the search executed in step S504, step S506, or step S508. Then, the service unit 11 sends the search result to the origin of the search request (i.e. mobile terminal 20 or stationary terminal (not illustrated)). The search result does not necessarily need to be returned as is. That is, the search result may be returned after being processed by the service unit 11. Alternatively, the search result may be returned after executing a further search with respect to the base unit 12.

Figure 11:
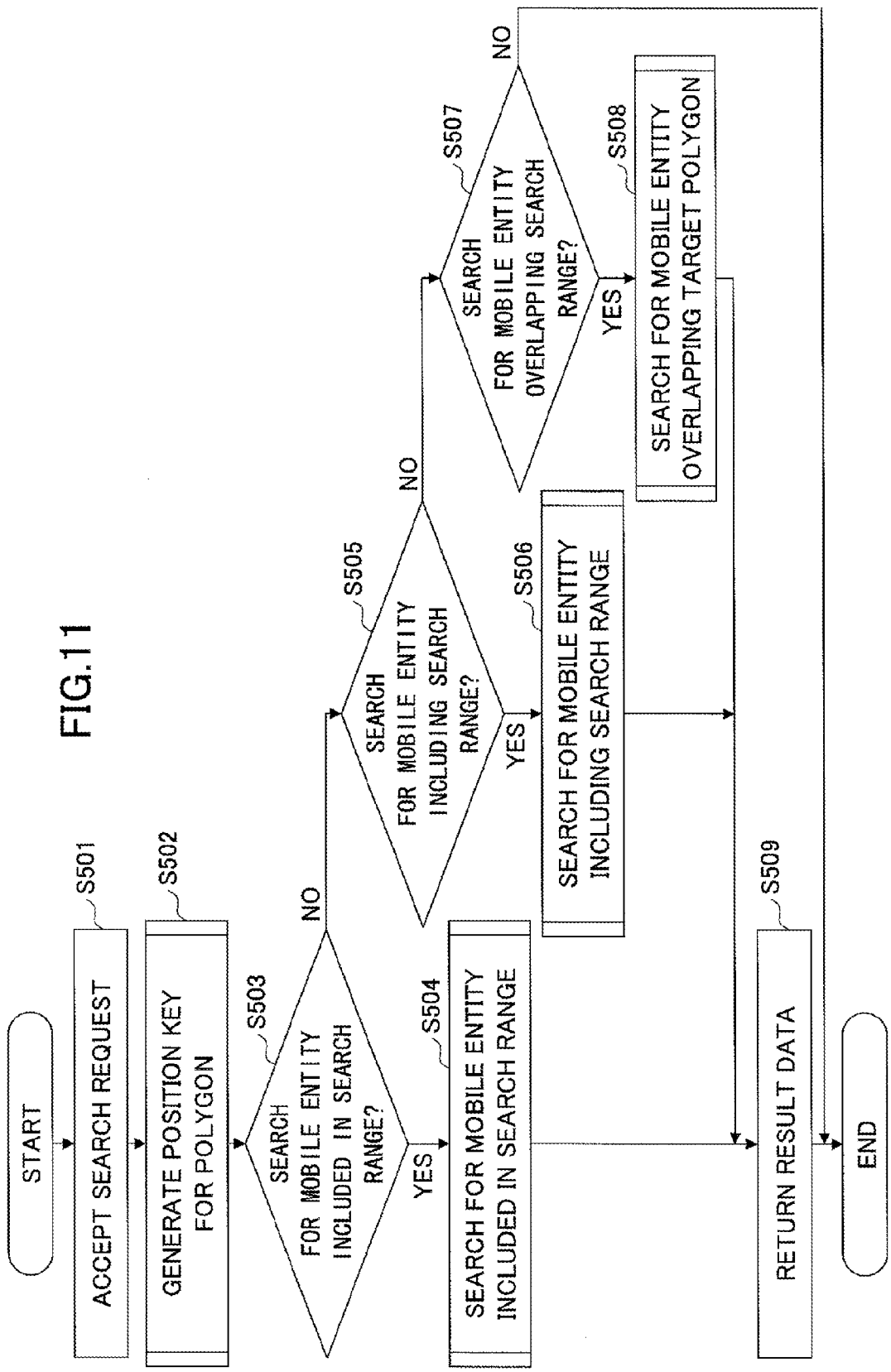
FIG. 11 is a flowchart for describing an example of procedures of searching for mobile entity data according to an embodiment of the present invention.
Figure 12:
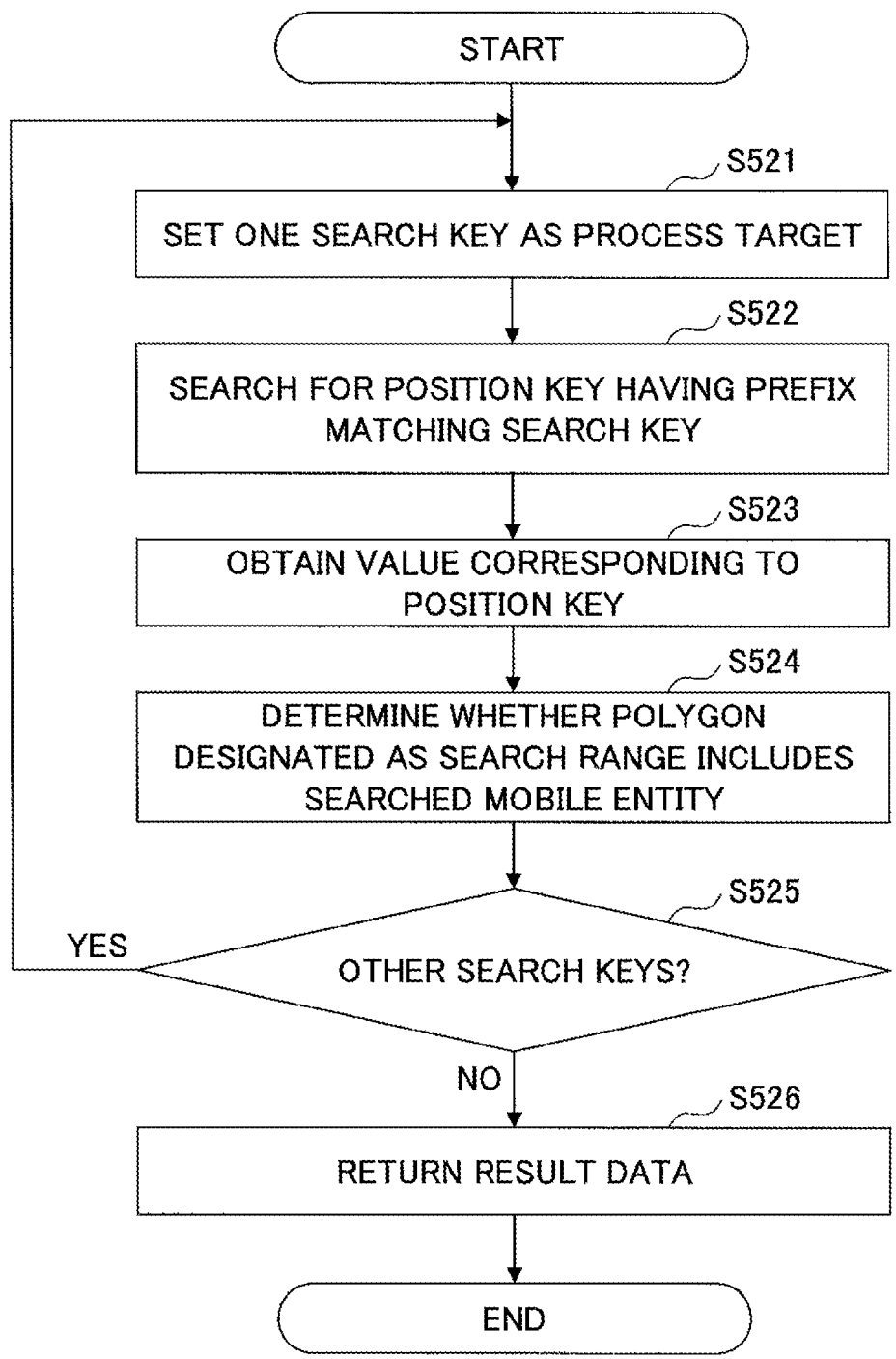
FIG. 12 is a flowchart for describing an example of procedures of searching for mobile entity data included in a search range according to an embodiment of the present invention.

Next, the step S504 of FIG. 11 is described in further detail. FIG. 12 is a flowchart for describing an example of procedures of executing a search for a mobile entity included in a search range.

In Step S521, the searching unit 128 sets one of the search keys generated in Step S502 of FIG. 11 as a process target. The search key that is set as the process target is hereinafter referred to as "target search key". Then, the searching unit 128 searches the mobile entity data storage unit 131 for a position key having a prefix that matches the target search key (Step S522). It is to be noted that the "position key having a prefix that matches the target search key" is a position key in which the entire target search key is included partly or entirely from the front (beginning) of the position key (i.e. forward match). Therefore, a match of a prefix not only includes a case where the entire target search key matches a front part of a position key but also includes a case where the entire target search key matches from the front to the end of a position key (i.e. perfect match).

The position key having a prefix matching the target search key corresponds to a position key corresponding to a unit rectangle that matches a unit rectangle corresponding to the target search key or a unit rectangle included in the unit rectangle corresponding to the target search key. This aspect is described with the drawings described below.

Figure 13:
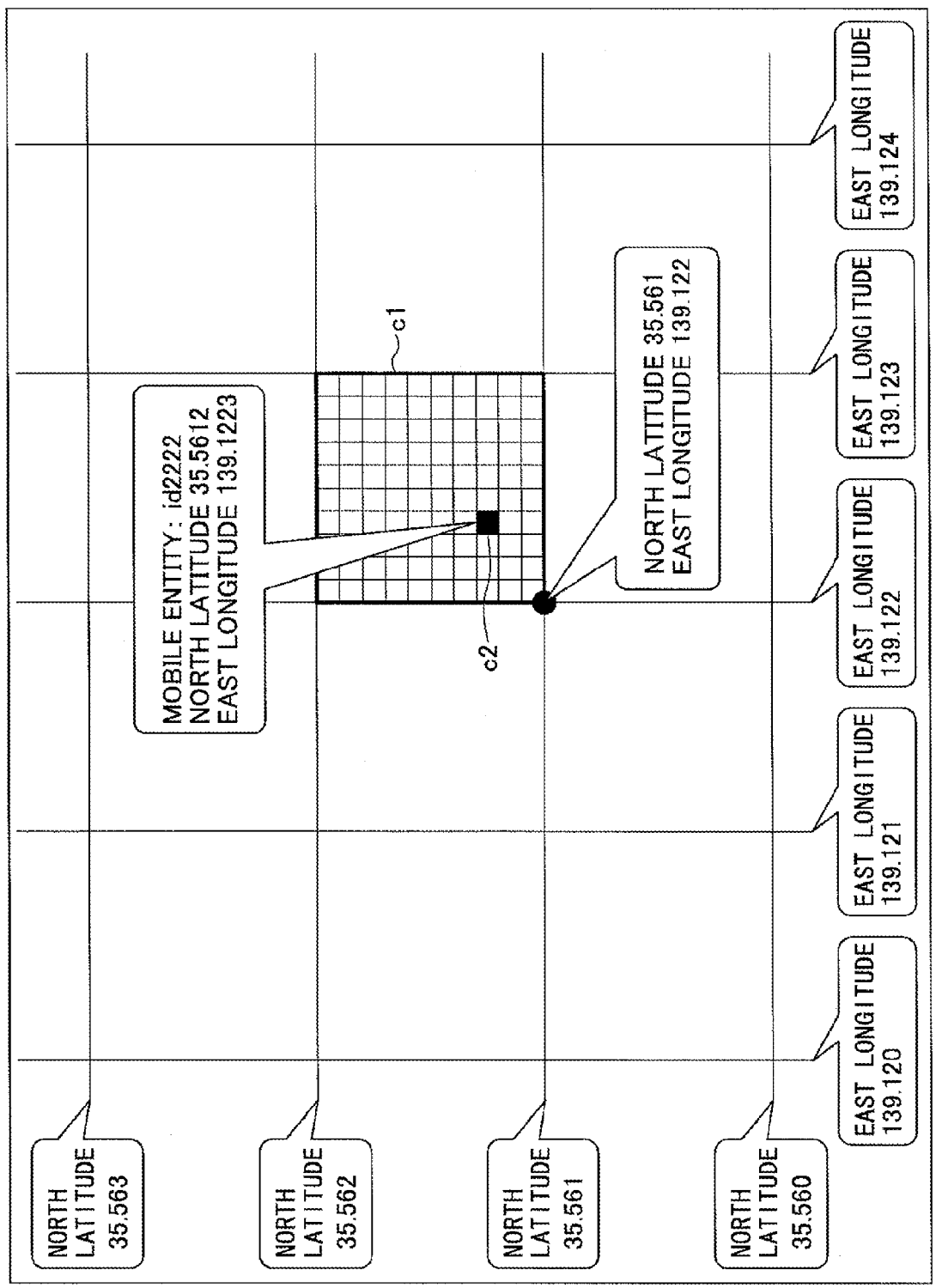
FIG. 13 is a schematic diagram for describing the significance of a forward match with a search key according to an embodiment of the present invention.

FIG. 13 is a schematic diagram for describing the significance of the forward match with the search key. In FIG. 13, the latitude and longitude corresponding to the search key is indicated as (35.561, 139.122), and the latitude and longitude corresponding to the position key of the mobile entity stored in the mobile entity data storage unit 131 is indicated as (35.561, 139.1223). In this case, the unit rectangle indicated by the search key corresponds to a unit rectangle c1 surrounded by bold lines in FIG. 13. On the other hand, the unit rectangle indicated by the position key of the mobile entity corresponds to a unit rectangle c2 colored in black. As clearly illustrated in FIG. 13, the unit rectangle c1 includes the unit rectangle c2.

Further, in a case where the latitude and longitude (35.561, 139.122) is converted into a position key (i.e. search key), the latitude and longitude become "++1003395152621". In a case where the latitude and longitude (35.5612, 139.1223) is converted into a corresponding position key, the latitude and longitude become "++10339515262132". Accordingly, the corresponding position key exhibits a forward match with the search key.

Accordingly, in a case where the position key exhibits a forward match with the search key, the unit rectangle indicated by the position key either matches or is included in the unit rectangle indicated by the search key. Owing to this characteristic of the position key, a mobile entity having the possibility of being included in the search range can be searched at high speed according to the above-described embodiment of the present invention.

In other words, according to the above-described embodiment of the present invention, in order for a high speed search to be executed based on a forward matching key in a case of searching a mobile entity included in a given range, the latitude and longitude is changed to a format of the position key and becomes a KSV key. For example, supposing a case where a position key is indicated by a character string that simply has latitude and longitude connected and arranged in this order, it would be difficult to perform the above-described high speed search based on a forward matching key. In a case where the search key is indicated as a character string that simply has latitude and longitude connected and arranged in this order according to the example of FIG. 13, the search key would be indicated as "+35561+139122". Further, in a case where the position key of the mobile entity is indicated as a character string that simply has latitude and longitude connected and arranged in this order according to the example of FIG. 13, the position key of the mobile entity would be indicated as "+355612+1391223". Thus, the position key of the mobile entity does not exhibit a forward match with the search key. Due to the characteristics of the KVS, it is difficult to perform a search with a key expressed by a regular expression of "+35561*+139122*". It is to be noted that "*" represents a wild card.

As described above, the size of a unit rectangle depends on the accuracy of the latitude and longitude that indicates the left lower vertex of the unit rectangle. With respect to the unit rectangle c1, the latitude and longitude of the left lower vertex is a unit of 1/1000. Accordingly, the unit rectangle c1 corresponds to a rectangular area in which each side of the rectangular area is 1/1000. With respect to the unit rectangle c2, the latitude and longitude of the left lower vertex is a unit of 1/10000. Accordingly, the unit rectangle c2 corresponds to a rectangular area in which each side of the rectangular area is 1/10000. That is, the more characters a position key has, the smaller the unit rectangle corresponding to the position key becomes.

Then, the searching unit 128 obtains mobile entity data (i.e. value corresponding to the searched position key) stored in the mobile entity data storage unit 131 (Step S523). Then, the searching unit 128 determines whether the polygon indicated by the polygon data designated as the search range includes the polygon indicated by the polygon data included in the obtained mobile entity data (Step S524). The determination may be performed by using a known geometric calculating method. In a case where the polygon indicated by the polygon data designated as the search range includes the polygon indicated by the polygon data included in the obtained mobile entity data, the mobile entity data is included in the result data.

In other words, an inclusion relationship between a search key and a position key does not always match an inclusion relationship between a polygon of the search key and a polygon of the position key. This is because the unit rectangle corresponding to the search key is a range that has rounded a polygon of the search range whereas the unit rectangle corresponding to the position key is a range that has rounded a polygon of the mobile entity. Therefore, the polygon indicated by the polygon data associated with the position key searched in Step S522 is not always included in the polygon indicated by the polygon data designated as the search range. Therefore, in order to determine the inclusion relationship between polygons, geometric calculation is to be performed based on the polygon data of the polygons. However, in this embodiment, the number of polygon data to be used for the geometric calculation can be rapidly narrowed down by Step S522. In other words, mobile entities having no possibility of being included in the search range can be eliminated from search candidates (candidates to be searched) in Step S522. Therefore, the amount of calculation in Step S524 can be reduced.

Steps S521-S524 are performed on all search keys generated in Step S502 of FIG. 11 (Step S525). Then, the searching unit 128 returns the result data (Step S526).

Figure 14C:
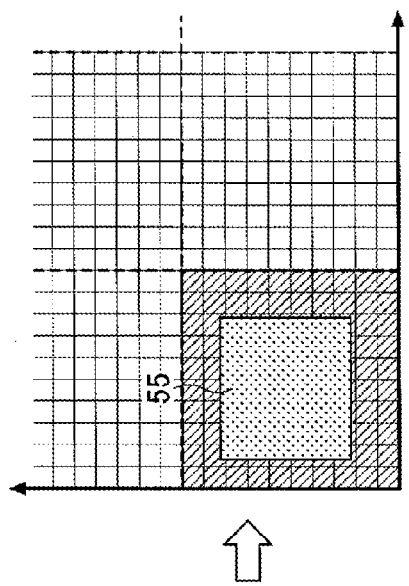
FIGS. 14A-14C are schematic diagrams for describing a process of searching for a mobile entity included in a search range according to an embodiment of the present invention.
Figure 14B:
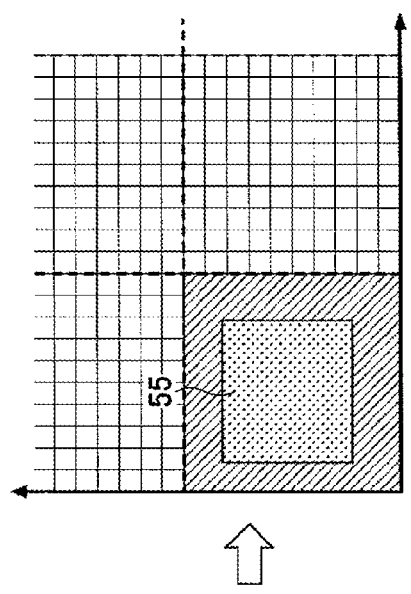
Figure 14A:
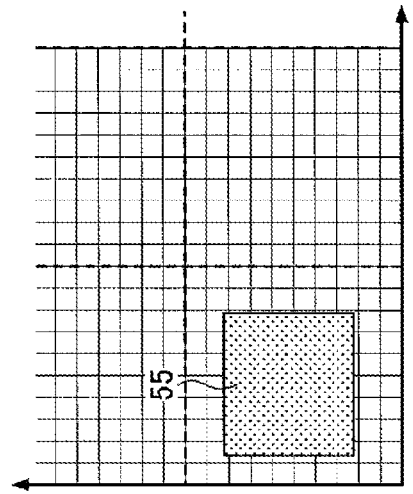

The process of FIG. 12 may be conceptually illustrated as FIGS. 14A-14C. FIG. 14A illustrates a MBR 55 with respect to a polygon of a search range. In FIG. 14B, the area indicated with hatchings represents a minimum unit rectangle with respect to the MBR 55. That is, the minimum unit rectangle of FIG. 14B is a unit rectangle indicated by a search key. By searching a position key exhibiting a forward match with the search key, a position key corresponding to a polygon included in the unit rectangle can be searched. FIG. 14C illustrates a state where the unit rectangle indicated by the search key being divided by unit rectangles having an accuracy one digit higher than the unit rectangle indicated by the search key. In other words, position keys corresponding to the unit rectangles divided in a manner illustrated in FIG. 14C are also included in the position keys exhibiting a forward match with the search key. That is, polygons included in the divided unit rectangles are also searched. In a case where there are position keys corresponding to unit rectangles of higher accuracy, those position keys are also searched. However, the position keys of higher accuracy are not illustrated in FIG. 14A-14C for the sake of convenience.

Figure 15:
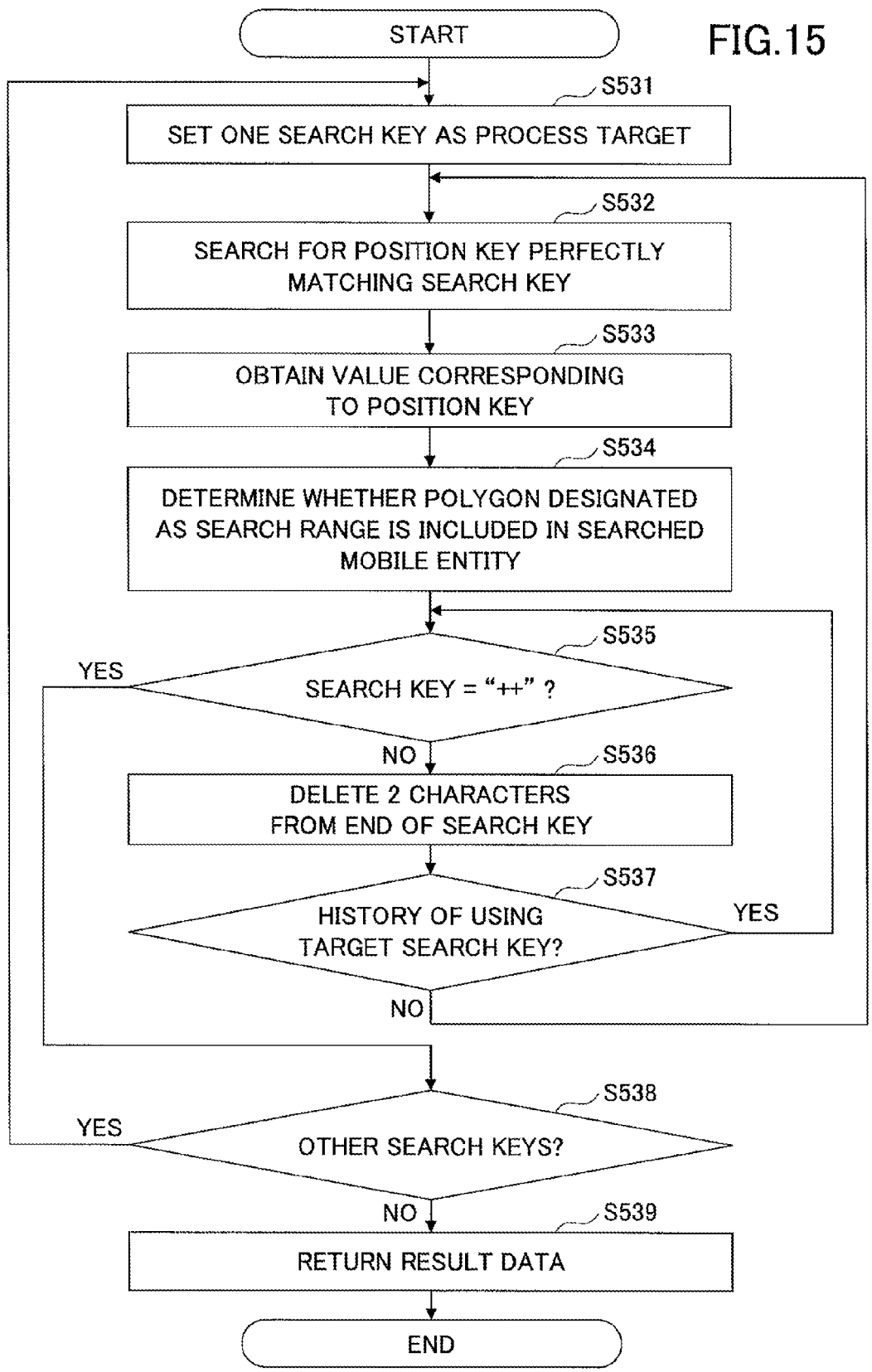
FIG. 15 is a flowchart for describing an example of procedures of executing a search for a mobile entity including in a search range according to an embodiment of the present invention.

Next, the step S506 of FIG. 11 is described in further detail. FIG. 15 is a flowchart for describing an example of procedures of executing a search for a mobile entity including in a search range.

In Step S531, the searching unit 128 sets one of the search keys generated in Step S502 of FIG. 11 as a process target. The search key that is set as the process target is hereinafter referred to as "target search key". Then, the searching unit 128 searches the mobile entity data storage unit 131 for a position key that perfectly matches the target search key (Step S532). It is to be noted that, after the searching unit 128 uses a target search key for searching for a position key, the searching unit 128 stores the target search key as a used search key to, for example, the memory device 103.

Then, the searching unit 128 obtains mobile entity data (i.e. value corresponding to the searched position key) stored in the mobile entity data storage unit 131 (Step S533). Then, the searching unit 128 determines whether the polygon indicated by the polygon data designated as the search range includes the polygon indicated by the polygon data included in the obtained mobile entity data (Step S534). The determination may be performed by using a known geometric calculating method. In a case where the polygon indicated by the polygon data designated as the search range includes the polygon indicated by the polygon data included in the obtained mobile entity data, the mobile entity data is included in the result data.

Then, the searching unit 128 determines whether the target search key includes only two characters "++" (Step S535). In a case where the target search key includes characters other than "++" (No in Step S535), the searching unit 128 deletes two characters from the end (tail) of the target search key (Step S536). As a result, a unit rectangle of the target search key becomes a unit rectangle having 1 digit higher compared to the digits of the unit rectangle prior to the deletion of the two characters. For example, in a case where the unit rectangle corresponding to the target search key was previously a unit rectangle of 1/10000, the unit rectangle of the target search key becomes 1/100. Thus, the target search key in the following processes is a search key having two characters deleted from its end.

Then, the searching unit 128 determines whether there is a usage history of the target search key (Step S537). For example, the target search key determines whether the target search key is already stored as a used search key in the memory device 103. In a case where there is no usage history of the target search key (No in Step S537), the processes performed on and after Step S532 are repeated for the target search key. That is, the process of deleting two characters from the end until the target search key becomes "++" and the process of searching for a position key that perfectly matches the target search key are performed.

Figure 16:
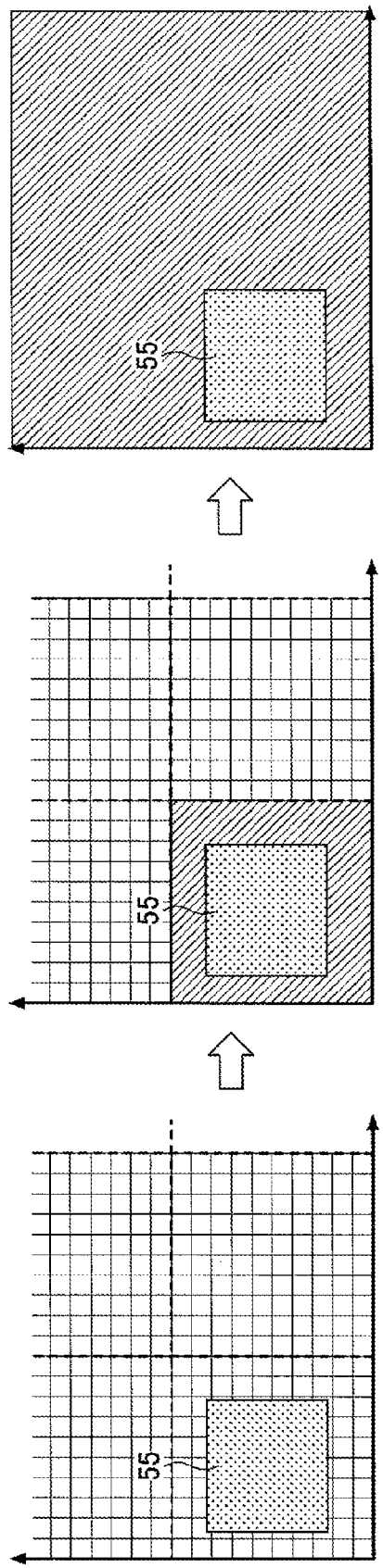
FIGS. 16A-16C are schematic diagrams for describing a process of searching for a mobile entity including a search range according to an embodiment of the present invention.

For example, the processes illustrated in FIGS. 16A-16C are performed in Steps S532-S537.

FIGS. 16A-16C are schematic diagrams for describing a process of searching for a mobile entity including a search range. FIG. 16A illustrates a MBR 55 with respect to a polygon of a search range. In FIG. 16B, the area indicated with hatchings represents a minimum unit rectangle with respect to the MBR 55. That is, the area indicated with hatchings in FIG. 16B indicates a unit rectangle indicated by the initial target search key. Here, the term "initial" is defined as a state of the target search key before a part of the target search key is deleted therefrom. Accordingly, at the first time of performing Step S532, a position key corresponding to the polygon included in the unit rectangle indicated by the initial target search key.

In FIG. 16C, the area indicated with hatchings indicate a unit rectangle area indicated by the target search key from which two characters or more are deleted from its end. Therefore, when Step S532 is performed for the second time and after, the position key corresponding to the polygon included in the unit rectangle area is searched.

That is, a case where a polygon of the search range is included in a certain polygon is equivalent to a case where the certain polygon includes the polygon of the search range. Therefore, as described above with FIG. 13, the position key corresponding to at least the certain polygon exhibits a forward match with a position key corresponding to the polygon of the search range. Accordingly, in order to search for a position key exhibiting a forward match with the initial target search key, a search is performed for a position key exhibiting a perfect match with a character string of the target search key from which two characters are deleted from its end in Steps S532-S537.

However, the polygon indicated by the polygon data associated with the position key searched in Step S532 is not always a polygon included in a polygon indicated by the polygon data designated in the search range. Therefore, in order to determine the inclusion relationship between polygons, geometric calculation is to be performed based on the polygon data of the polygons. However, in this embodiment, the number of polygon data to be used for the geometric calculation can be rapidly narrowed down by Step S532. Therefore, the amount of calculation in Step S534 can be reduced.

Steps S532-S537 are performed on all search keys generated in Step S502 of FIG. 11 (Step S538). Then, the searching unit 128 returns the result data (Step S539).

Figure 17:
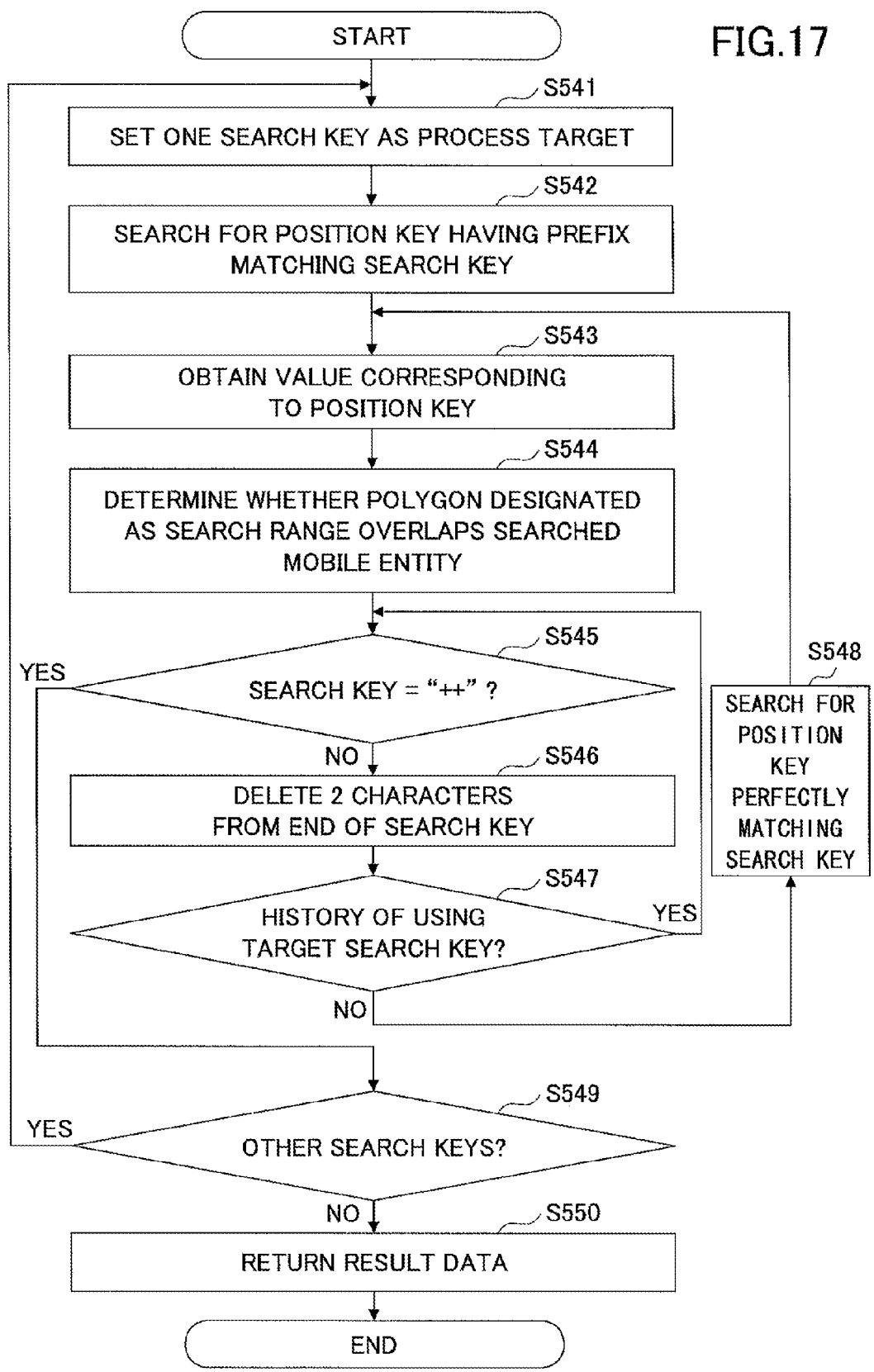
FIG. 17 is a flowchart for describing an example of procedures of executing a search for a mobile entity overlapping with a search range according to an embodiment of the present invention.

Next, the step S506 of FIG. 11 is described in further detail. FIG. 17 is a flowchart for describing an example of procedures of executing a search for a mobile entity overlapping with a search range.

A case where a mobile entity overlaps with a search range is a case where a part or all of a polygon representing a shape of a mobile entity overlaps with a part or all of a polygon of a search range. That is, a case where a mobile entity overlaps with a search range includes, for example, a case where a polygon representing a shape of a mobile entity includes a polygon of a search range, and a case where polygon representing a shape of a mobile entity is included in a polygon of a search range. Therefore, the content of the processes of FIG. 17 are basically a combination of the processes of FIGS. 12 and 15.

That is, Steps S541-S544 of FIG. 17 are substantially the same as Steps S521-S524 of FIG. 12. Further, Steps S45 and after of FIG. 17 are substantially the same as Steps S535 and after of FIG. 15.

Accordingly, search candidates (mobile entities) having a possibility of overlapping with the search range can be rapidly narrowed down in Step S542 or Step S548. As a result, the amount of calculation in Step S544 can be reduced.

Accordingly, with the above-described embodiment of the present invention, a position key corresponding to a minimum unit rectangle including a MBR of a polygon representing the shape of a mobile entity or a position key corresponding to a unit rectangle having the same size as a minimum unit rectangle and including a part of a MBR are registered in a KVS as a key corresponding to mobile entity data. As a result, in a case where there is a forward match or a perfect match between position keys, polygons having the possibility of exhibiting an inclusion relationship or an overlapping relationship with each other can be rapidly searched. Accordingly, position data can be managed while attaining a practical search performance.

In this embodiment, mobile entity data is described to be the target for registration and search for the sake of convenience. However, the target for registration and search is not limited to that described above. For example, other data may be used as the target for registration and search as long as the data includes polygon data indicating position and range.

Further, in this embodiment, the format of the position key is not limited to that described above. For example, in this embodiment, although longitude and latitude are indicated in this order where each of the digits of latitude and longitude are alternately arranged, the order of the longitude and latitude may be reversed.

Further, all of the digits of latitude and longitude do not necessarily need to be alternately arranged. That is, the digits higher than the accuracy during search (i.e. accuracy of search key) need not be alternately arranged. In the example of FIG. 13, the accuracy of the search key is the third digit below the decimal point. Therefore, regarding the digits higher than the third digit below the decimal point, the character string of longitude and the character string of latitude may be sequentially arranged. More specifically, in the example of FIG. 13, the search key is "+3556+1391221". Further, the position key of the mobile entity is "+3556+139122132". The search key and the position key of the mobile entity both have the character string of latitude and the character string of longitude alternately arranged with respect to the digits after the third digit below the decimal point. In this case, the position key of the mobile entity exhibits a forward match with the search key.

The position key according to the above-described embodiment of the present invention is a character string in which all digits or a part of the digits beginning from the lowest digit of latitude and longitude (of the same digits) are alternately arranged digit by digit. In the example illustrated above, a part of the digits beginning from the lowest digits refers to the digits below the third digit below the decimal point.

Further, according to the above-described embodiment, the range of latitude is +90 degrees (north latitude) to −90 degrees (south latitude), and the range of longitude is +180 degrees (east longitude) to −180 degrees (west longitude). Alternatively, the range of latitude may be 0 degrees to 180 degrees, and the range of longitude may be 0 degrees to 360 degrees. In this case, the characters indicating the positive (+) sign or the negative (−) sign may be omitted from two characters at the beginning of the position key.

Further, although the above-described position key is generated by an example that directly uses the values of latitude and longitude, the position key may be generated by, for example, recursively or hierarchically dividing a two-dimensional pace with a quadtree.

Figure 18:
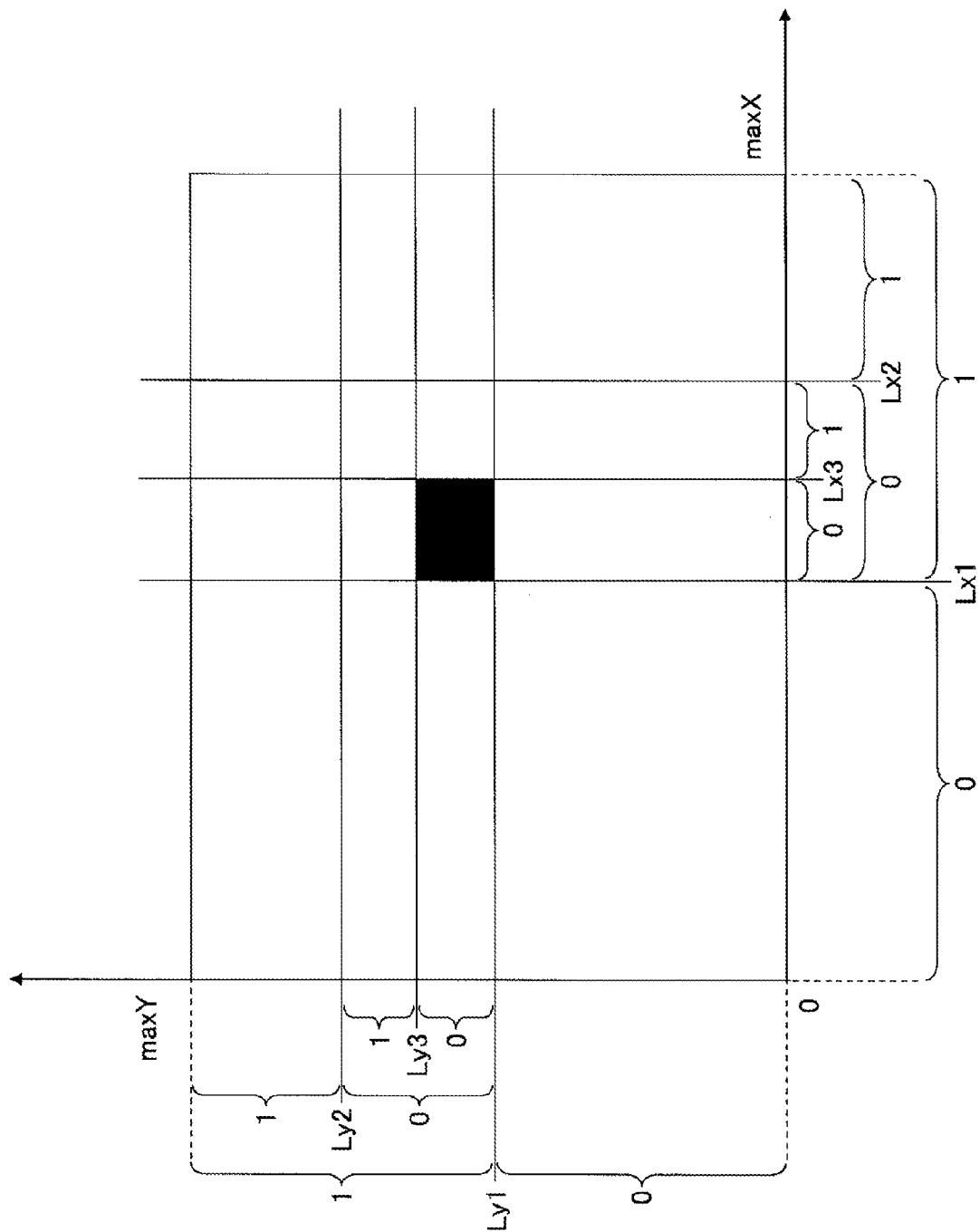
FIG. 18 is a schematic diagram for describing an example of a method for generating a position key with a quadtree according to an embodiment of the present invention.

FIG. 18 is a schematic diagram for describing an example of a method for generating a position key with a quadtree. In FIG. 18, the area colored in black is a minimum unit rectangle including a MBR of a polygon according to an embodiment of the present invention. In this example, "110000" is assigned to the unit rectangle with the quadtree. Accordingly, a character string of "110000" may be assumed as a position key corresponding to a polygon included in the area of the minimum unit rectangle.

That is, in FIG. 18, a straight line Lx1 is a straight line that divides a range 0-maxX (X direction) into half. Each of the halves is assigned with "0" and "1". The straight line Lx2 is a straight line that divides a half region assigned with "1" and divided by the straight line Lx1. The straight line Lx3 is a straight line that divides a half region assigned with "0" and divided by the straight line Lx1. The same applies to straight lines Ly1, Ly2, and Ly3 in the Y direction.

As a result, a position key corresponding to the black colored unit rectangle in FIG. 18 becomes "110000". The value of the position key is equivalent to a value obtained by alternately arranging the X and Y direction coordinates of the same digits. Therefore, the above-described embodiment can also be applied to a case where the position key is obtained by a quadtree.

In a case of using a quadtree, a rectangle, which is formed by using a group of straight lines with a matching number of times for performing recursive division, becomes a unit rectangle. More specifically, in FIG. 18, the rectangle formed by the lines Lx1 and Ly2 is the maximum unit rectangle. The rectangle formed by the lines Lx2 and Ly2 is the second largest unit rectangle. It is to be noted that, although the half region, which is divided by the line Lx1 or Ly1 and assigned with "0", is further divided by Lx2 or Ly2, the half region is omitted in FIG. 18.

Further, although a quadtree is a method of recursively dividing an area into half in the X and Y directions, an area in the X direction and an area in the Y direction may be recursively divided into N parts. In the case of dividing into N parts, "N" is an integer equal to or greater than 1. For example, recursive equal division into 10 parts may be performed for obtaining a unit rectangle including a MBR of a polygon. A method of recursively equally dividing an area into N parts in the X and Y directions (including the quadtree method) is hereinafter referred to as $N^2$ tree.

In a case of using the $N^2$ tree, the maximum values in the X and Y directions of a two-dimensional space (i.e. values of maxX and maxY in FIG. 18) do not always need to be the maximum values of actual longitudes and latitudes. The maximum values may be expressed in a manner appropriate for the $N^2$ tree. For example, with the quadtree, a value of $2^n$ may be the maximum value. Although, in reality, polygons exist in the ranges of latitude and longitude, merely the number of digits increases without having a significant effect on the effectiveness of the above-described embodiment of the present invention.

The method of generating a position key with the $N^2$ tree is not a modified example of the above-described embodiment but is a generalization of the above-described embodiment. For example, there is used a two-dimensional coordinate space having a range of 0 to 1000 in the X direction (i.e. longitude direction) and a range of 0 to 1000 in the Y direction (i.e. latitude direction). Among the unit rectangles formed by recursively equally dividing the two-dimensional coordinate space into 10 parts, the minimum unit rectangle matching the MBR of the polygon or the minimum unit rectangle including the MBR is specified (identified). A character string, which is generated by assigning values to the identified unit rectangle or all unit rectangles including the identified unit rectangle in correspondence with the number of divided parts in the X and Y directions, and alternately arranging the assigned values starting from the values corresponding to large unit rectangles (the values being arranged from the values of the X direction or from the values of the Y direction), becomes the position key complying to the actual latitudes and longitudes. This case corresponds to a case where the range of longitude is assumed to be 0 to 360 degrees, and the range of latitude is assumed to be 0 to 180 degrees.

It is to be noted the values assigned in correspondence with the number of divided parts is 0 to 9 in a case where the two-dimensional coordinate space is divided into ten parts. That is, whenever, the recursive division is performed, each unit rectangle formed by the recursive division is assigned with values 0 to 9 in the X and Y directions, respectively.

Therefore, in the above-described embodiment, the target position key rectangle specifying unit 124 specifies a minimum unit rectangle among the unit rectangles formed by recursively dividing a two-dimensional coordinate space (including a range of latitude and longitude) in the X and Y directions, in which the specified minimum unit rectangle is a unit rectangle matching a MBR of the polygon or a unit rectangle including the MBR. Further, the position key generating unit 125 generates a single character string by assigning values to an identified unit rectangle or all unit rectangles including the identified unit rectangle in correspondence with the number of divided parts in the X and Y directions, and alternately arranging the assigned values starting from the values corresponding to large unit rectangles (the values being arranged from the values of the X direction or from the values of the Y direction).

In the above-described embodiment of the present invention, position keys are generating for representing a range of latitudes/longitudes in a two-dimensional coordinate space. Alternatively, the above-described embodiment of generating position keys may also be applied to a one-dimensional space or a three-dimensional space. Moreover, the above-described embodiment of generating position keys may also be applied to a N-dimensional space. Although a rapid high speed search is achieved by using unit rectangles in the above-described embodiment, a single straight line may be used for a one-dimensional space and a unit 3-dimensional rectangle may be used for a three-dimensional space.

As an example of the one-dimensional space, the above-described embodiment may be applied to a certain range (period) of time. For example, the above-described embodiment may be applied to a case of registering and searching attribute data of a mobile entity that has continued running (e.g., moving, operating) for a certain period of time. In this case, the above-described search performance can be attained by using a minimum unit time including the range of time as a key.

Figure 19:
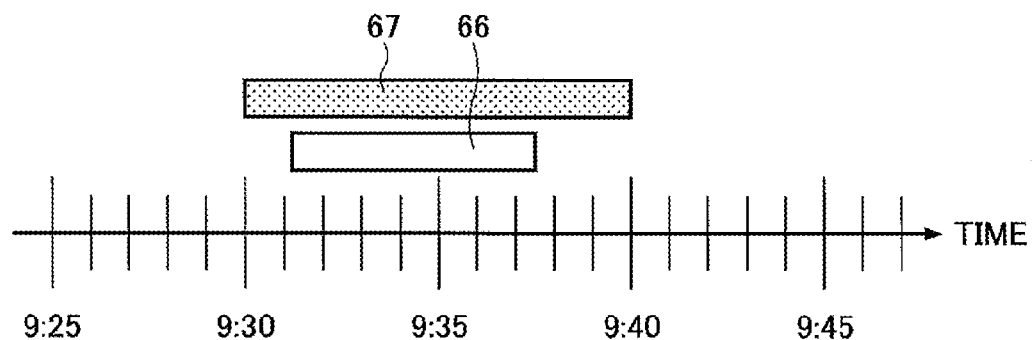
FIG. 19 is a schematic diagram illustrating an example of using a one-dimensional space according to an embodiment of the present invention.

FIG. 19 is a schematic diagram illustrating an example of using the one-dimensional space. In this example, a time range 66 ranges from Mar. 28, 2012, 9 hours 31 minutes 24 seconds to Mar. 28, 2012, 9 hours 37 minutes 46 seconds. In a case where the minimum unit time is 10 minutes, a minimum unit time including the time range 66 is Mar. 28, 2012, 9 hours 30 minutes. The value of this minimum unit time may be expressed as "201203280930" and used as a key for performing registration or search.

As an example of the three-dimensional space, the above-described embodiment may be applied to a case of handling three-dimensional polygon data with respect to latitude, longitude, and altitude. For example, the above-described embodiment may be applied to a case of registering and searching data of a position including altitude data in addition to latitude data and longitude data. In this case, the above-described search performance can be attained by using a minimum unit three-dimensional rectangle (i.e. minimum unit cuboid) including the range of the three-dimensional position as a key.

Figure 20:
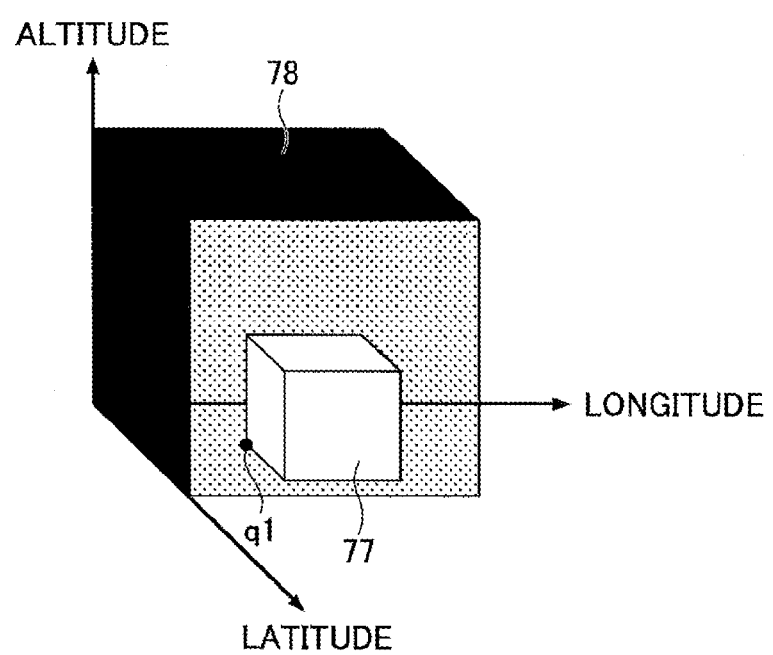
FIG. 20 is a schematic diagram illustrating an example of using a three-dimensional space according to an embodiment of the present invention.

FIG. 20 is a schematic diagram illustrating an example of using the three-dimensional space. In this example, a minimum bounding three-dimensional rectangle 77 (or minimum bounding cuboid 77) is derived from the three-dimensional polygon data. Then, three values corresponding to the latitude, longitude, altitude of a vertex q1 of the minimum bounding three-dimensional rectangle are converted into a predetermined format (e.g., digit alignment) and a position key of the minimum bounding three-dimensional rectangle 77 is obtained by arranging the converted values in order from the highest value. The above-described concept of digit-rounding is used to derive the minimum unit three-dimensional rectangle 78 and a position key corresponding to the minimum unit three-dimensional rectangle 78, so that the position key can be used for performing registration and search.

Accordingly, even where the number of dimensions is changed, data of a given range can be managed while attaining search performance by generating a key with the method/configuration of the above-described embodiment.

It is to be noted that the mobile entity data receiving unit 121 or the registration request accepting unit 122 is an example of an accepting unit. The position key generating unit 125 is an example of a generating unit. The mobile entity data storage unit 131, the facility data storage unit 132, and the area data storage unit 133 are examples of a storage unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for managing data by using a computer, the method comprising:
   accepting a registration request of polygon data including data pertaining to a latitude and a longitude of each vertex of a polygon;
   specifying a minimum unit rectangle that matches a minimum bounding rectangle of the polygon or includes the minimum bounding rectangle from a plurality of unit rectangles, the plurality of unit rectangles formed by recursively dividing a two-dimensional space including a latitude/longitude range, the two-dimensional space being equally divided in an X direction and a Y direction in the same number;
   generating a character string by assigning values indicating latitude and longitude to the identified minimum unit rectangle or all unit rectangles including the identified minimum unit rectangle in correspondence with the number of divided parts of the two-dimensional space in the X and Y directions, and alternately arranging the assigned values, in the X direction or the Y direction, in a descending order starting from values corresponding to a large unit rectangle among the plurality of unit rectangles; and
   storing the polygon data in correspondence with a key including the character string in a storage unit,
   wherein a size of each of the plurality of unit rectangles becomes smaller in correspondence with the descending order.

2. The method as claimed in claim 1,
   wherein the specifying of the minimum unit rectangle includes specifying the plurality of unit rectangles in a case where the minimum bounding rectangle steps over a plurality of the minimum bounding rectangles that has a size that includes the minimum bounding rectangle,
   wherein the generating of the character string includes generating the character string with respect to each of the specified plurality of unit rectangles.

3. The method as claimed in claim 1, further comprising:
   accepting a search request including data pertaining to a latitude and a longitude of each vertex of a second polygon;
   specifying a second minimum unit rectangle that matches a minimum bounding rectangle of the second polygon or includes the minimum bounding rectangle from the plurality of unit rectangles formed by recursively dividing the two-dimensional space, the two-dimensional space being equally divided in an X direction and a Y direction in the same number;
   generating a second character string by assigning values to the identified second minimum unit rectangle or all unit rectangles including the identified second minimum unit rectangle in correspondence with the number of divided parts of the two-dimensional space in the X and Y directions, and alternately arranging the assigned values, in the X direction or the Y direction, starting from values corresponding to a large unit rectangle among the plurality of unit rectangles; and
   searching for a key in the storage unit;
   wherein the key exhibits a forward match with the second character string.

4. The method as claimed in claim 1, further comprising:
   accepting a search request including data pertaining to a latitude and a longitude of each vertex of a second polygon;
   specifying a second minimum unit rectangle that matches a minimum bounding rectangle of the second polygon or includes the minimum bounding rectangle from the plurality of unit rectangles formed by recursively dividing the two-dimensional space, the two-dimensional space being equally divided in an X direction and a Y direction in the same number;
   generating a second character string by assigning values to the identified second minimum unit rectangle or all unit rectangles including the identified second minimum unit rectangle in correspondence with the number of divided parts of the two-dimensional space in the X and Y directions, and alternately arranging the assigned values, in the X direction or the Y direction, starting from values corresponding to a large unit rectangle among the plurality of unit rectangles; and
   searching for a key in the storage unit;
   wherein the key exhibits a perfect match with the second character string or a character string from which two characters are omitted from an end of the second character string.

5. A data management apparatus comprising:
   a memory configured to store a program therein; and
   a processor configured to execute a function of the data management apparatus according to the program stored in the memory, the processor including
      an accepting unit configured to accept a registration request of polygon data including data pertaining to a latitude and a longitude of each vertex of a polygon;
      a specifying unit configured to specify a minimum unit rectangle that matches a minimum bounding rectangle of the polygon or includes the minimum bounding rectangle from a plurality of unit rectangles, the plurality of unit rectangles formed by recursively dividing a two-dimensional space including a latitude/longitude range, the two-dimensional space being equally divided in an X direction and a Y direction in the same number;
      a generating unit configured to generate a character string indicating latitude and longitude by assigning values to the identified minimum unit rectangle or all unit rectangles including the identified minimum unit rectangle in correspondence with the number of divided parts of the two-dimensional space in the X and Y directions, and alternately arranging the assigned values, in the X direction or the Y direction, in a descending order starting from values corresponding to a large unit rectangle among the plurality of unit rectangles; and
      a storage unit configured to store the polygon data in correspondence with a key including the character string, wherein a size of each of the plurality of unit rectangles becomes smaller in correspondence with the descending order.

6. The method as claimed in claim 1, wherein the specifying includes specifying the minimum unit rectangle having a width that matches the minimum bounding rectangle of the polygon or includes the minimum bounding rectangle from a plurality of unit rectangles having different widths.

7. The data management apparatus as claimed in claim 5, wherein the specifying unit is configured to specify the minimum unit rectangle having a width that matches the minimum bounding rectangle of the polygon or includes the minimum bounding rectangle from a plurality of unit rectangles having different widths.

8. The method as claimed in claim 1, wherein the specifying of the minimum unit rectangle includes specifying the plurality of unit rectangles in a case where the minimum bounding rectangle steps over the plurality of unit rectangles having a size that includes the minimum bounding rectangle.

9. The data management apparatus as claimed in claim 5, wherein the specifying unit is further configured to specify the plurality of unit rectangles in a case where the minimum bounding rectangle steps over the plurality of unit rectangles having a size that includes the minimum bounding rectangle.

* * * * *